H. D. COLMAN.
WARP TYING APPARATUS.
APPLICATION FILED JULY 12, 1909.
1,082,474.
Patented Dec. 23, 1913.
15 SHEETS—SHEET 3.
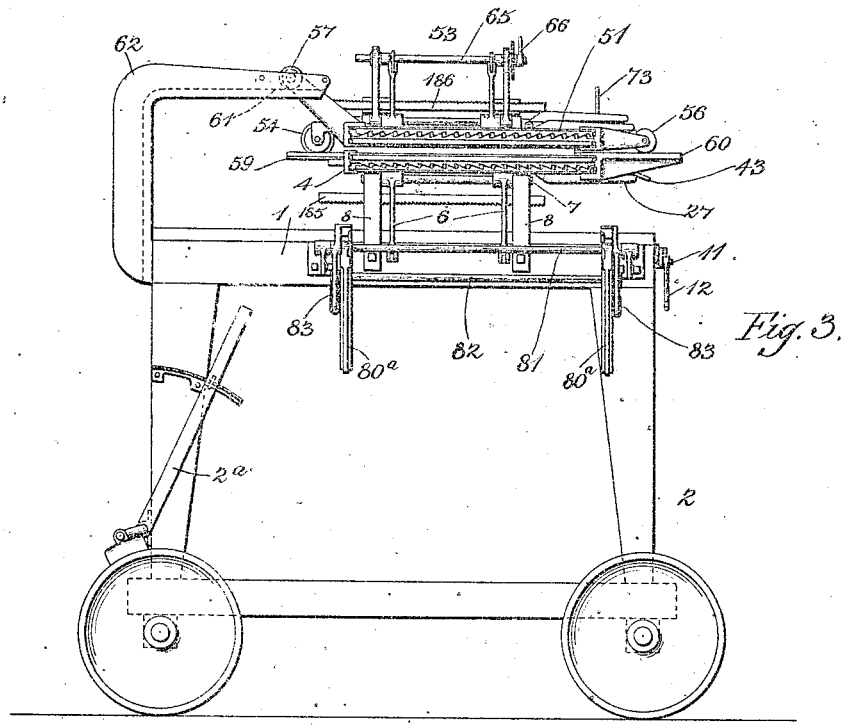
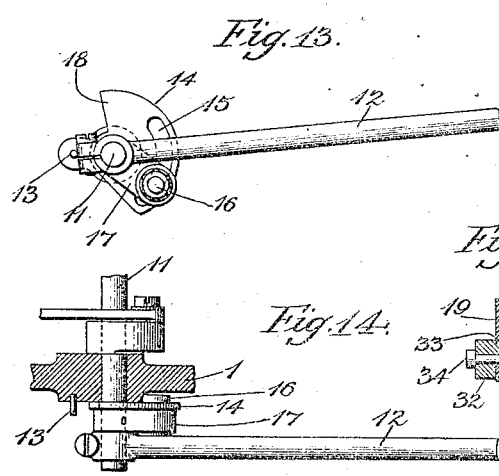
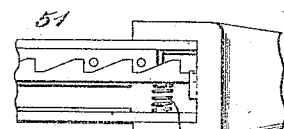
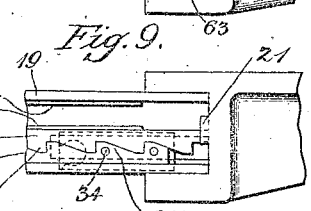
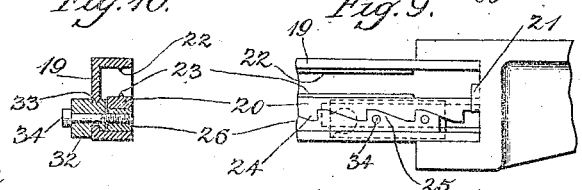
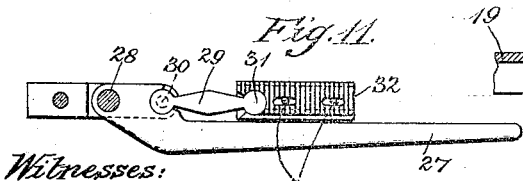
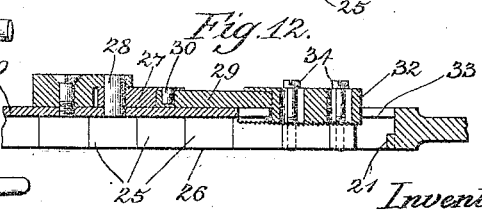
Witnesses:
J. C. Devich
George L. Chindahl
Inventor:
Howard D. Colman
By Luther L. Miller
Attorney.

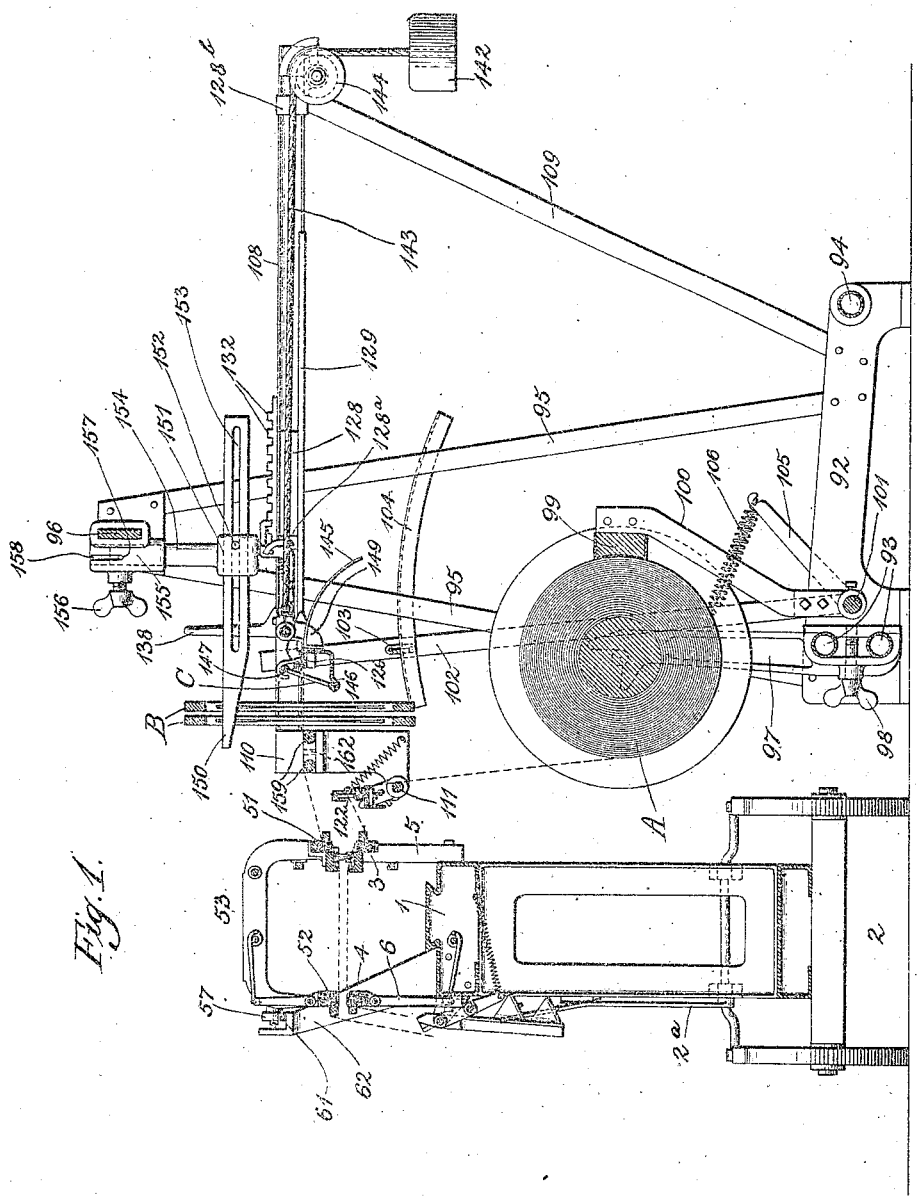

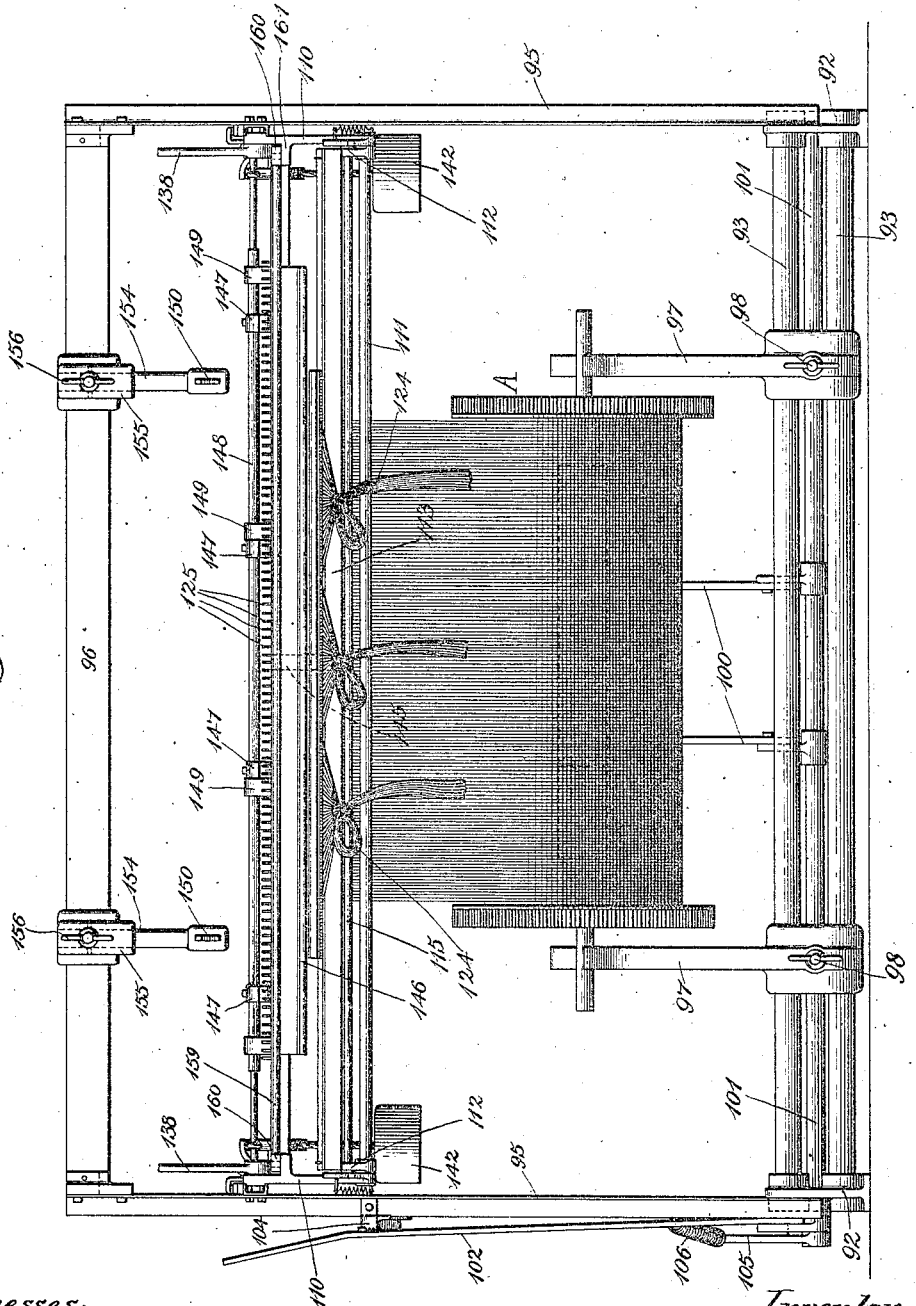

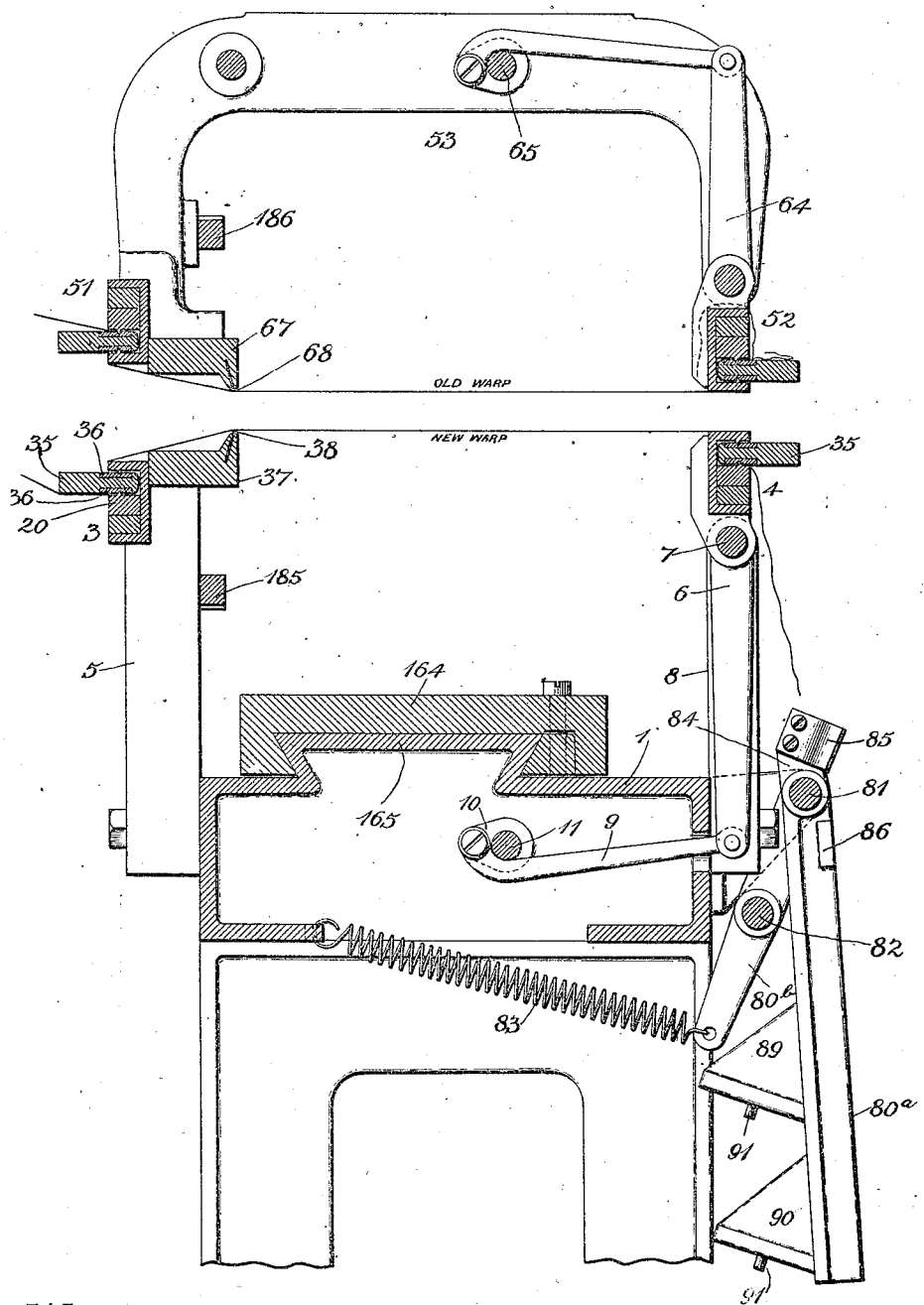

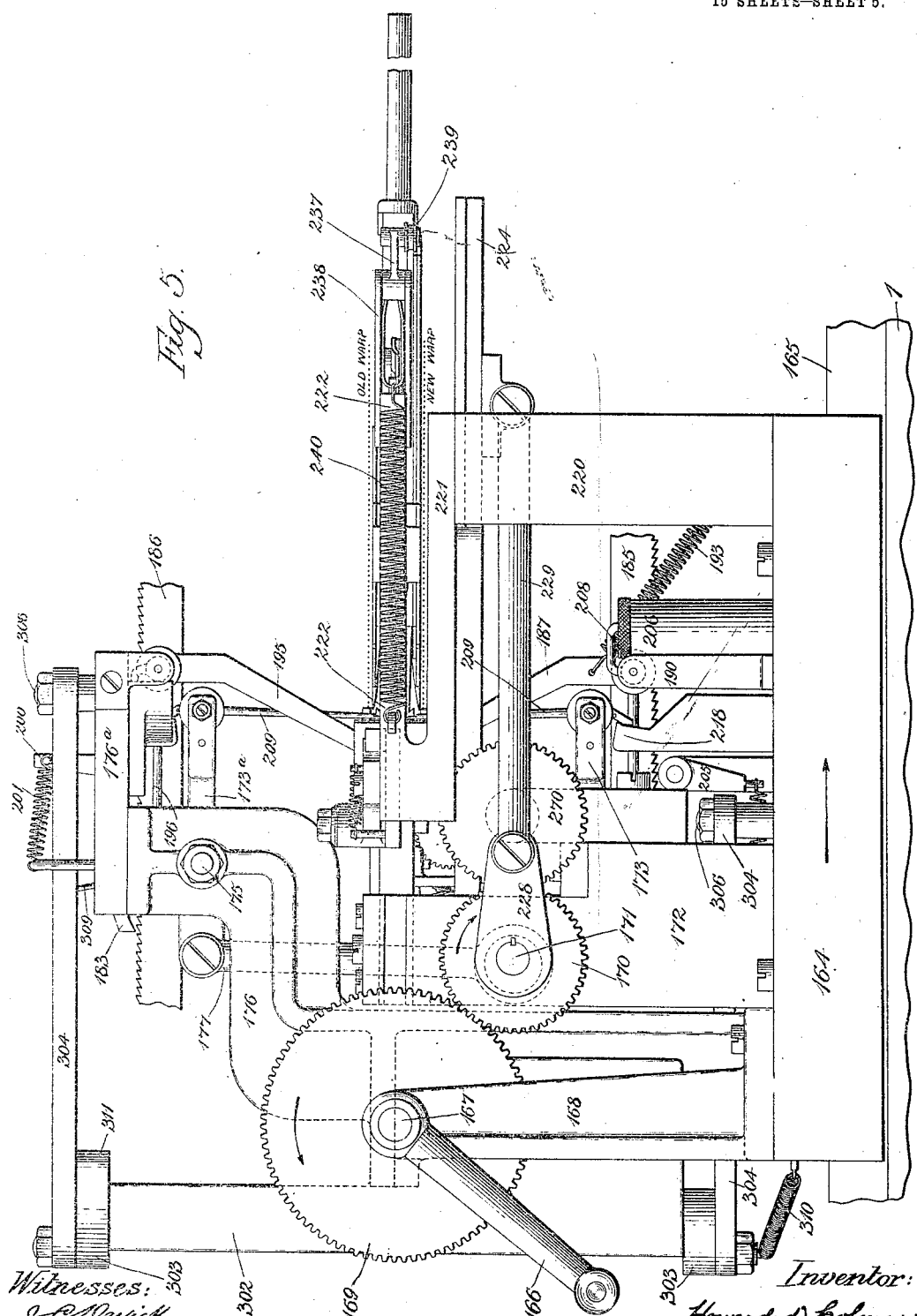

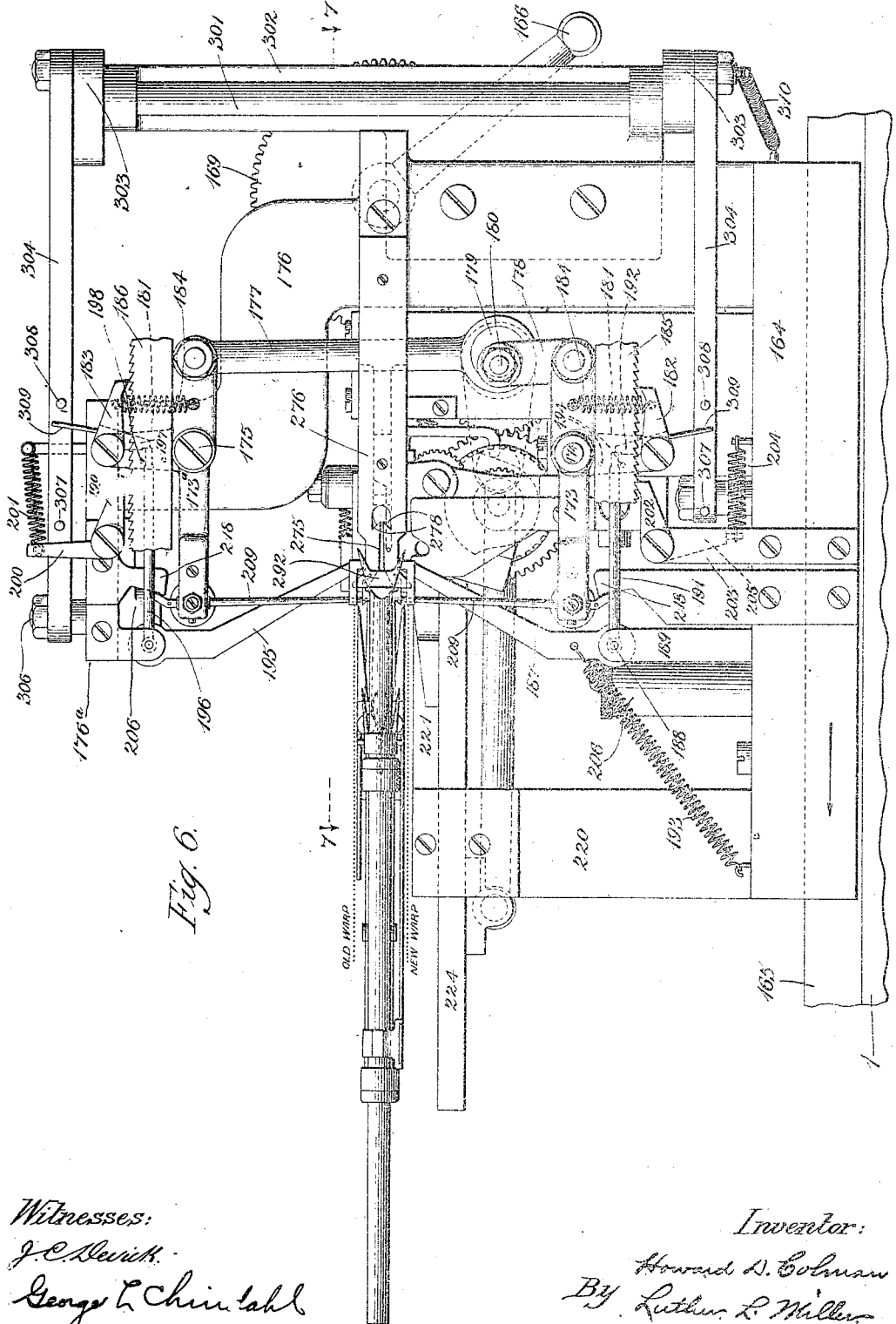

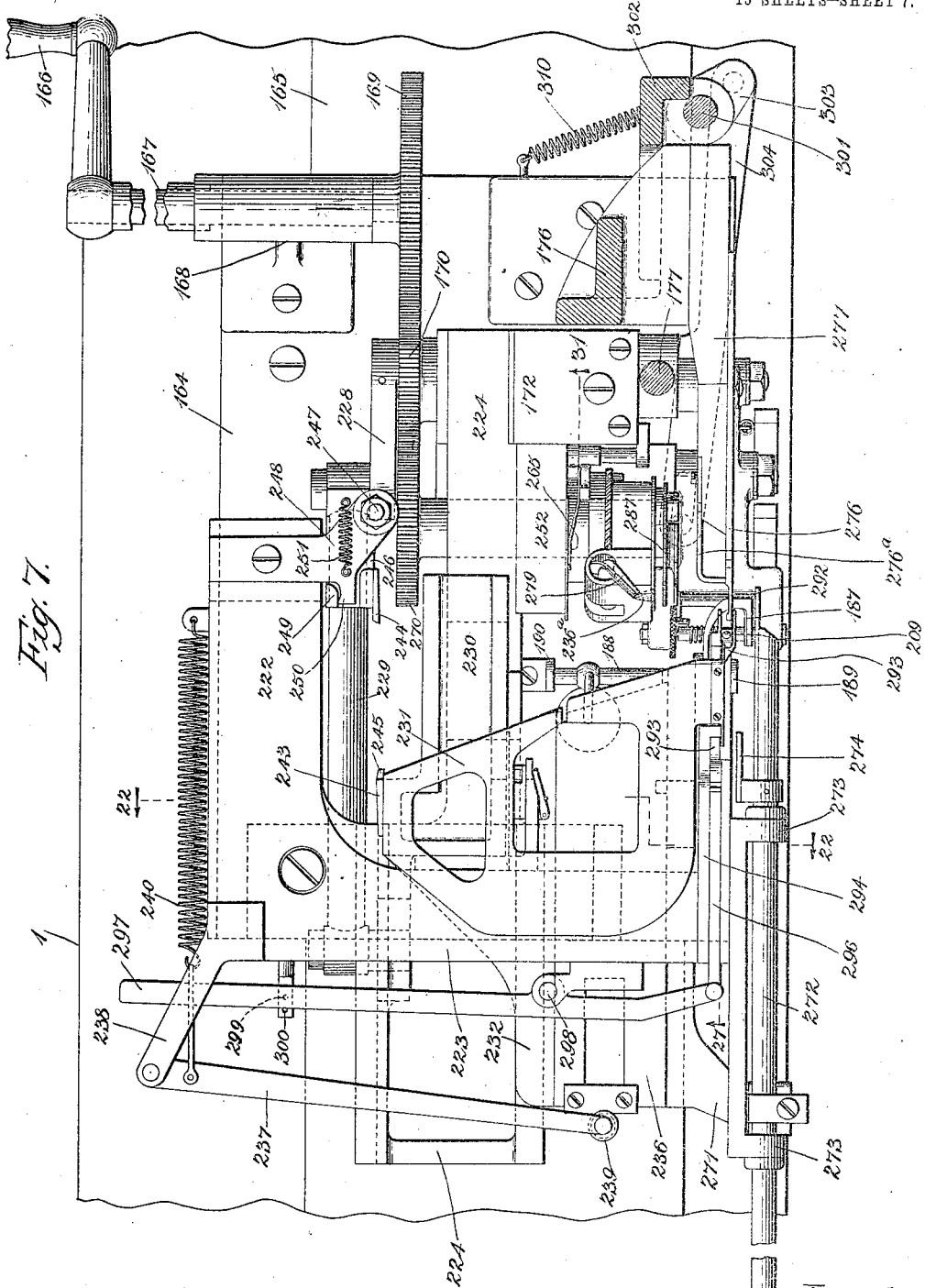

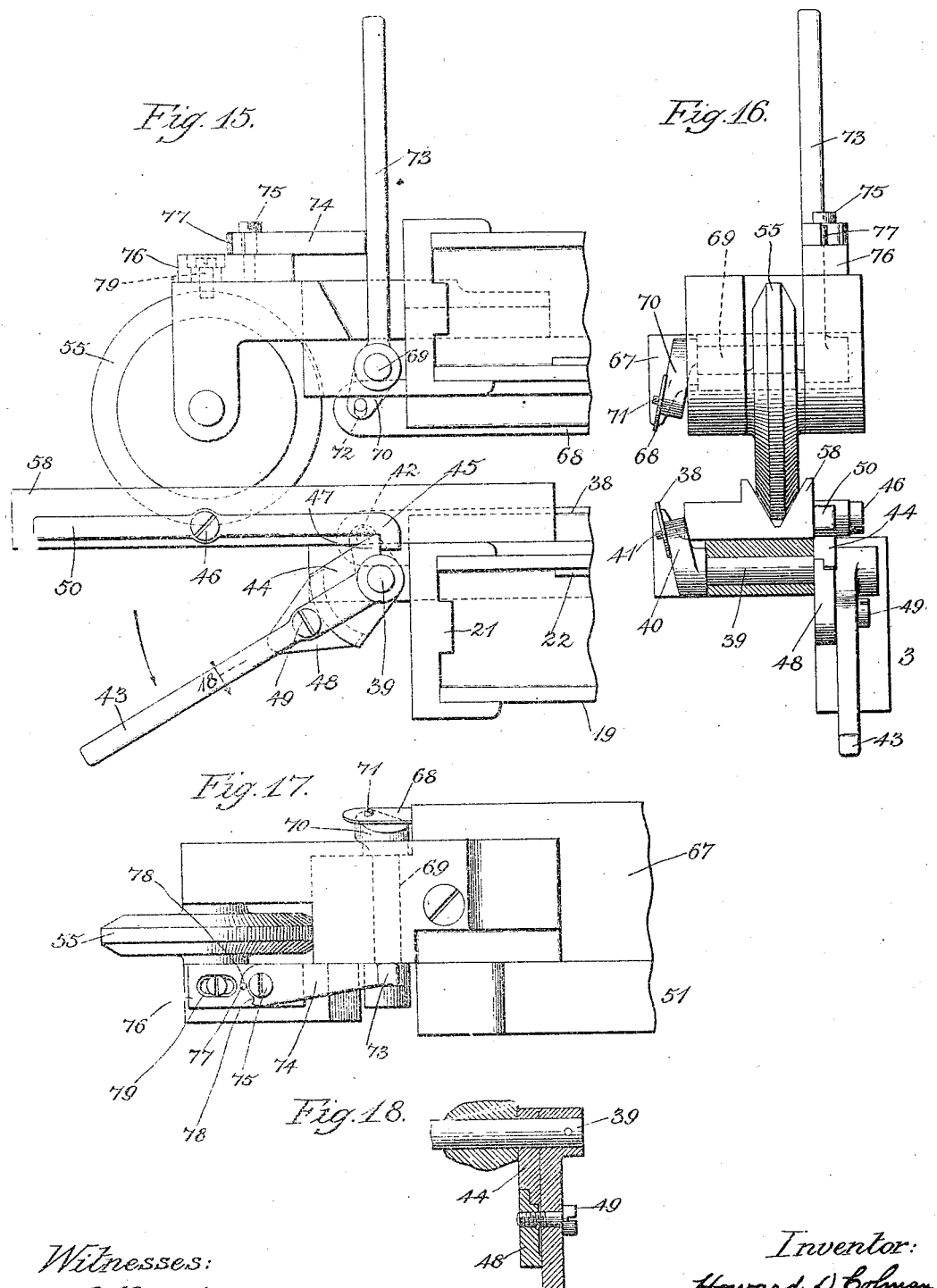

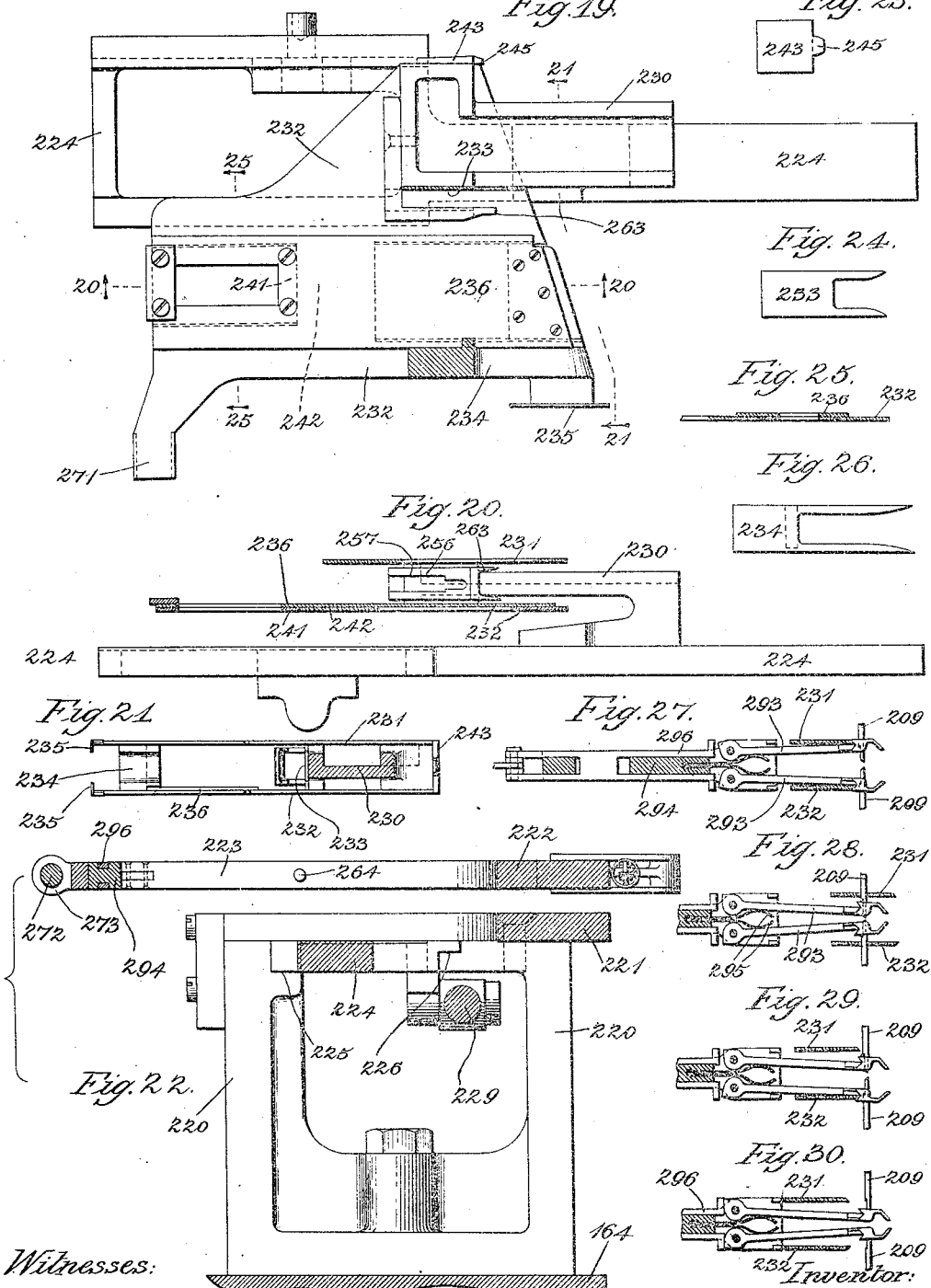

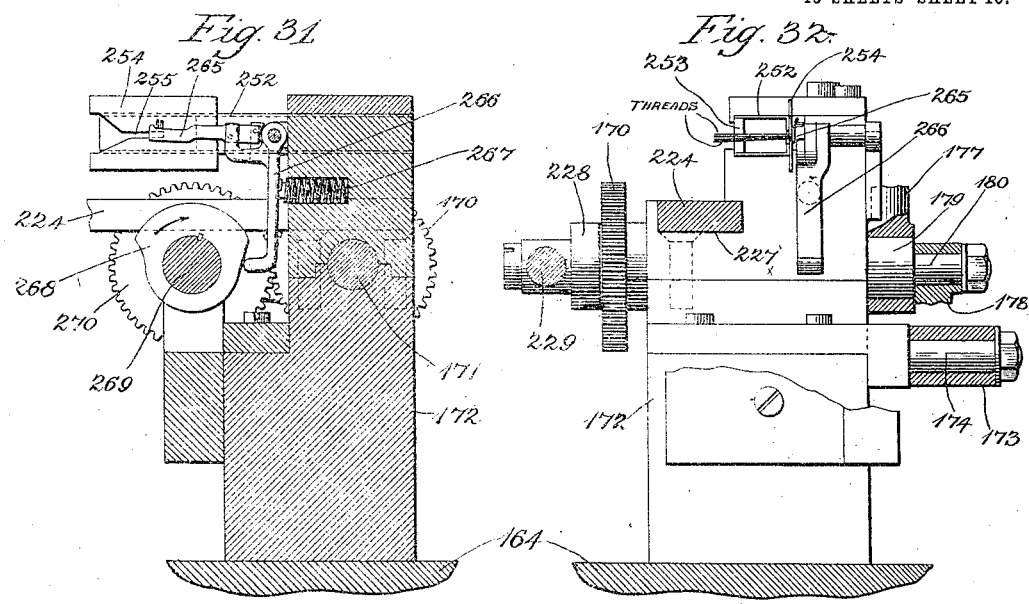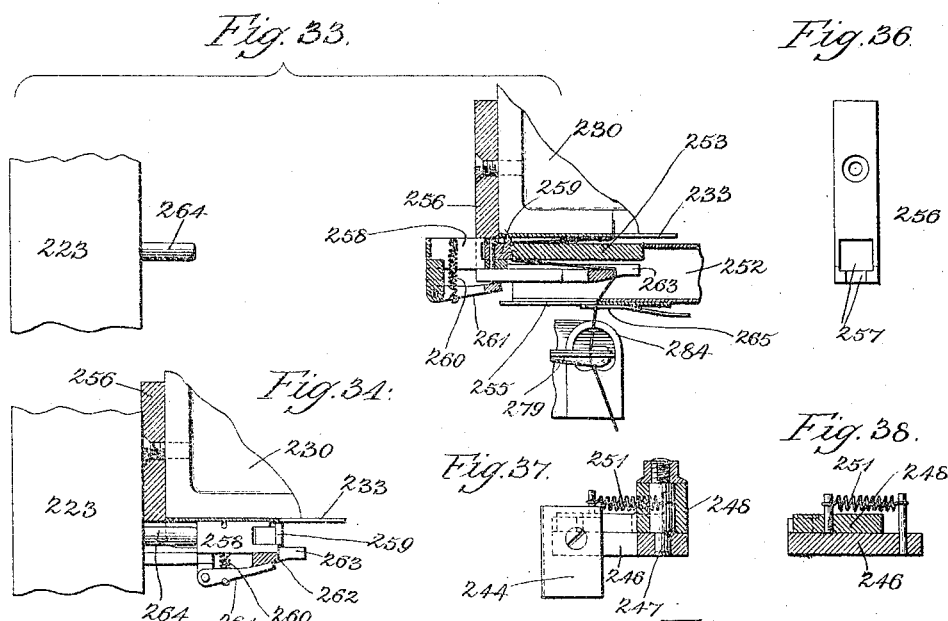

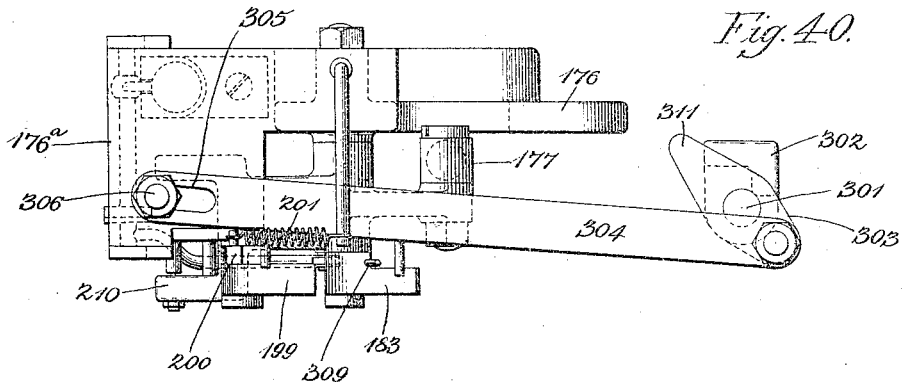
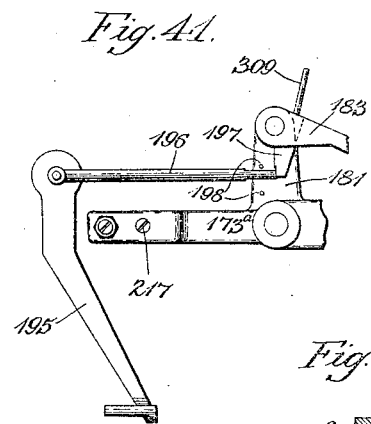
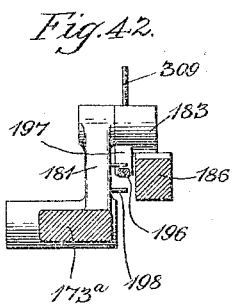
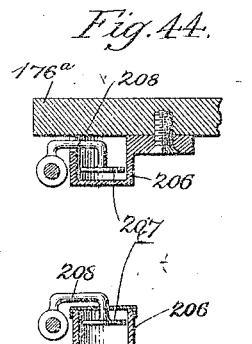
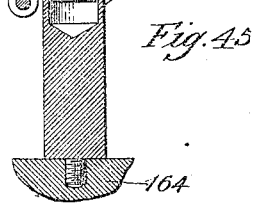
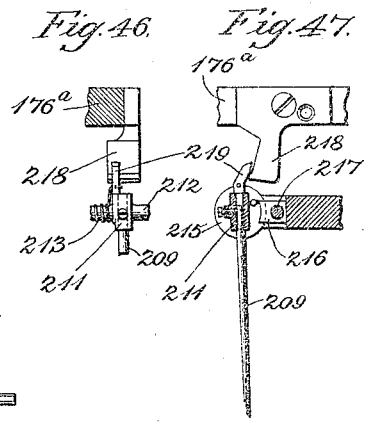
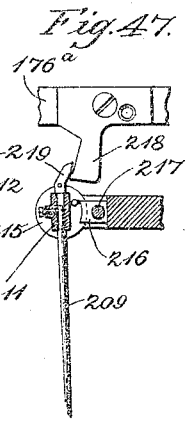
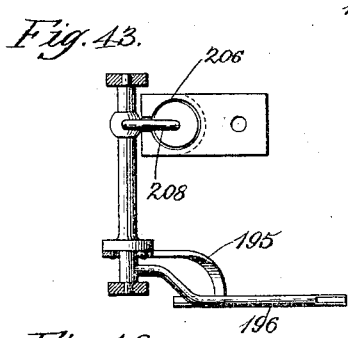
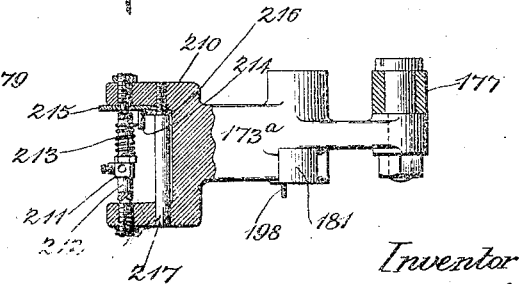

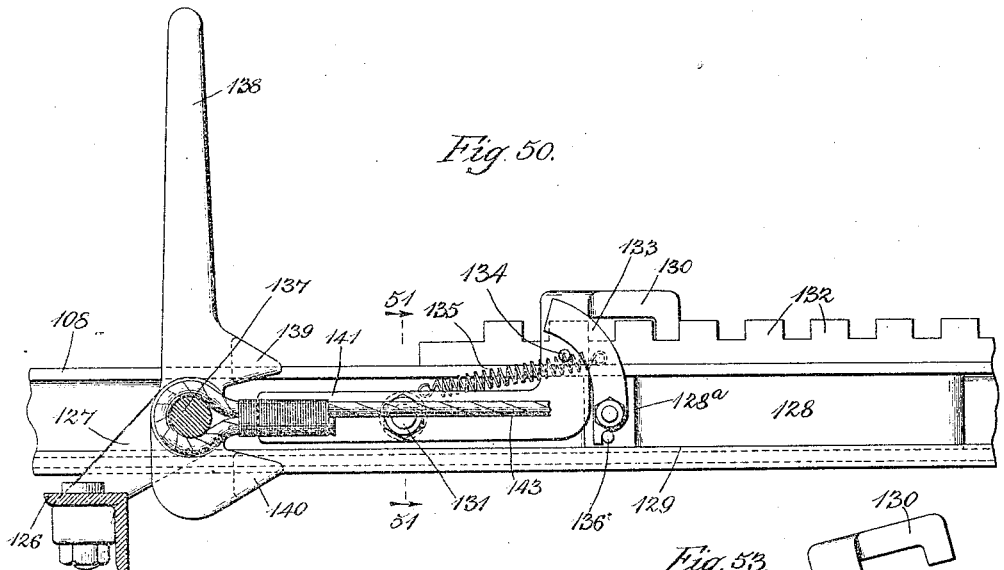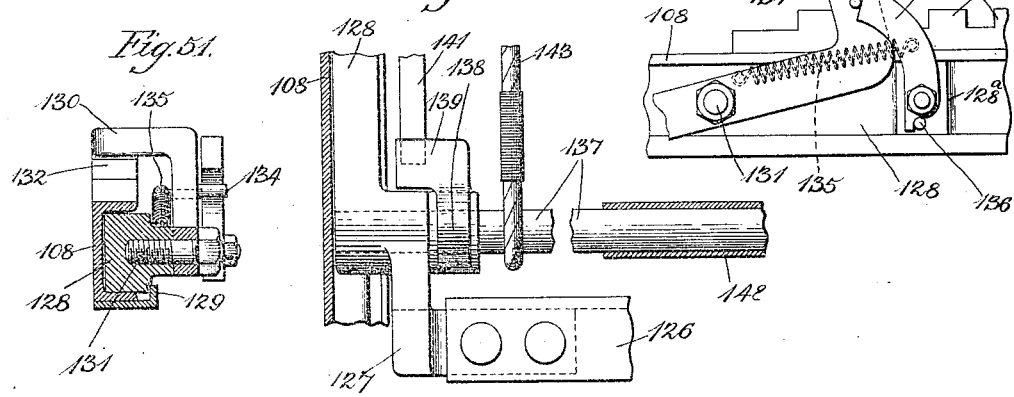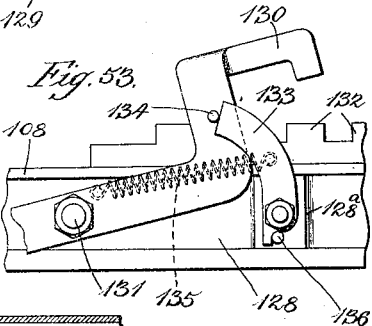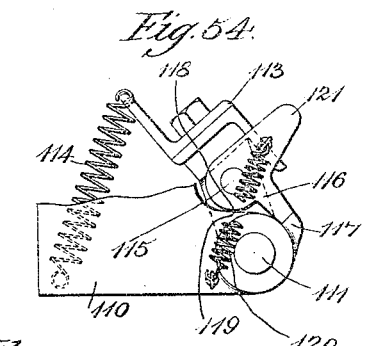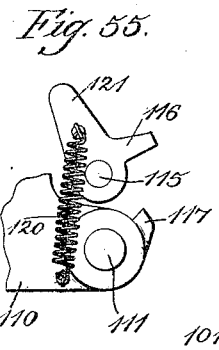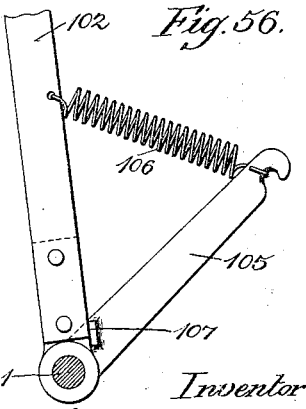

H. D. COLMAN.
WARP TYING APPARATUS.
APPLICATION FILED JULY 12, 1909.
1,082,474.
Patented Dec. 23, 1913.
15 SHEETS—SHEET 13.
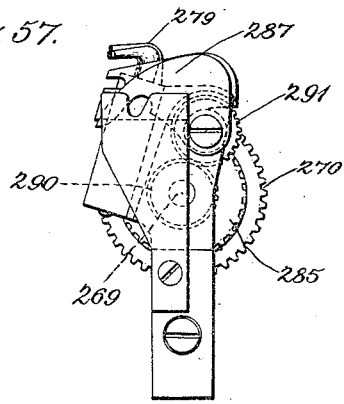
Fig. 57.
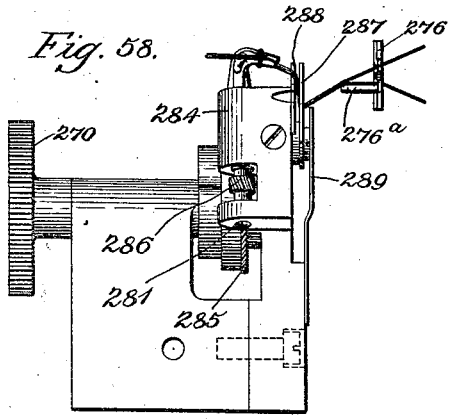
Fig. 58.
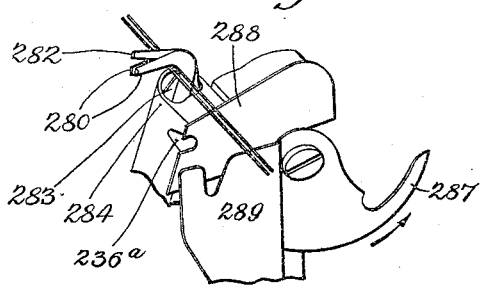
Fig. 59.
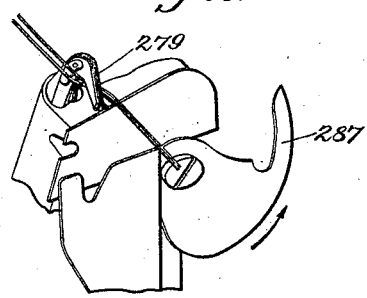
Fig. 60.
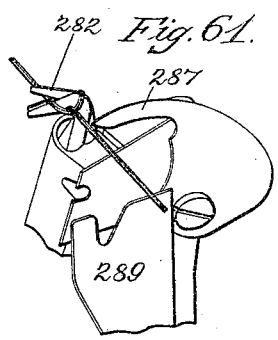
Fig. 61.
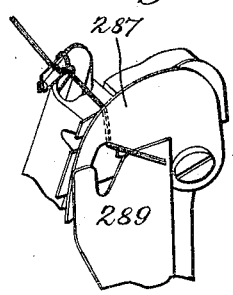
Fig. 62.
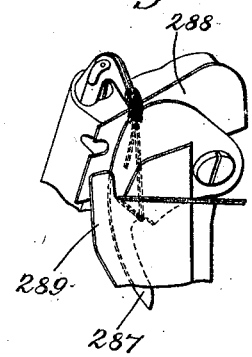
Fig. 63.
Fig. 64.
Witnesses:
J. C. Derick.
George L. Chindahl
Inventor:
Howard D. Colman
By Luther L. Miller
Attorney.

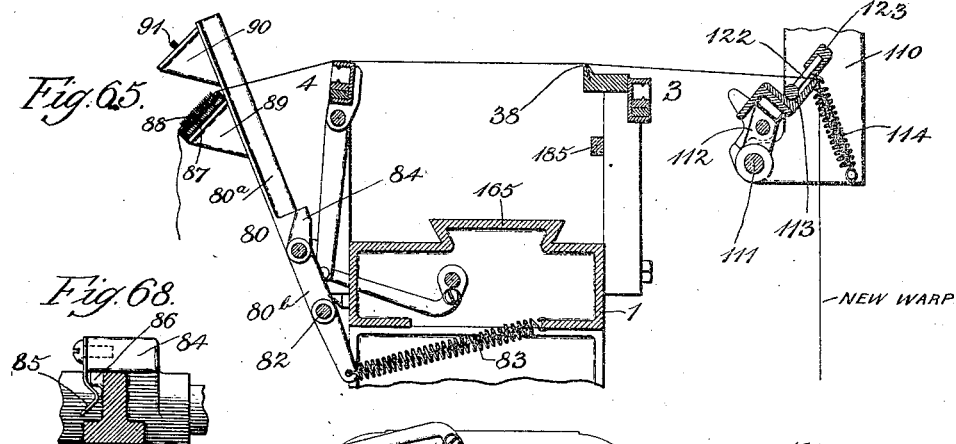
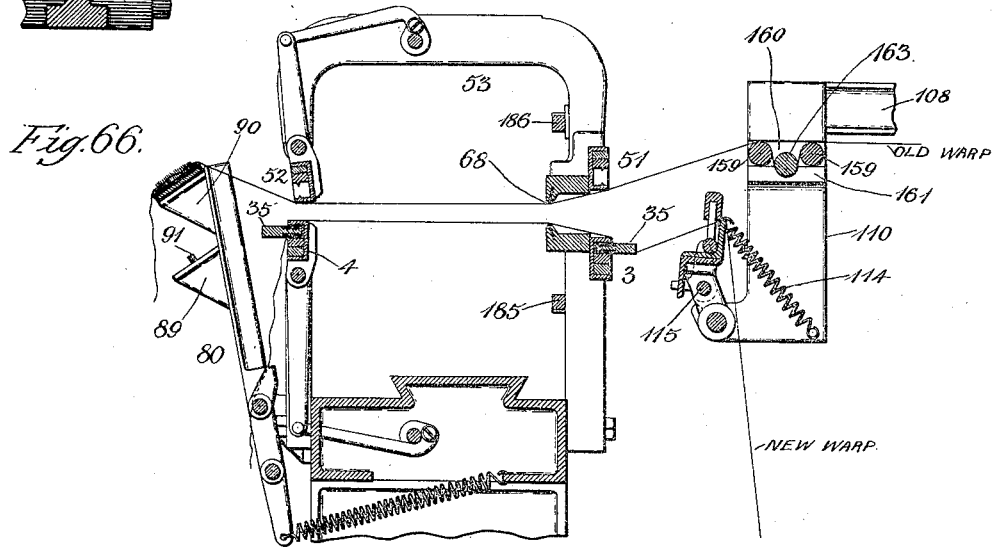
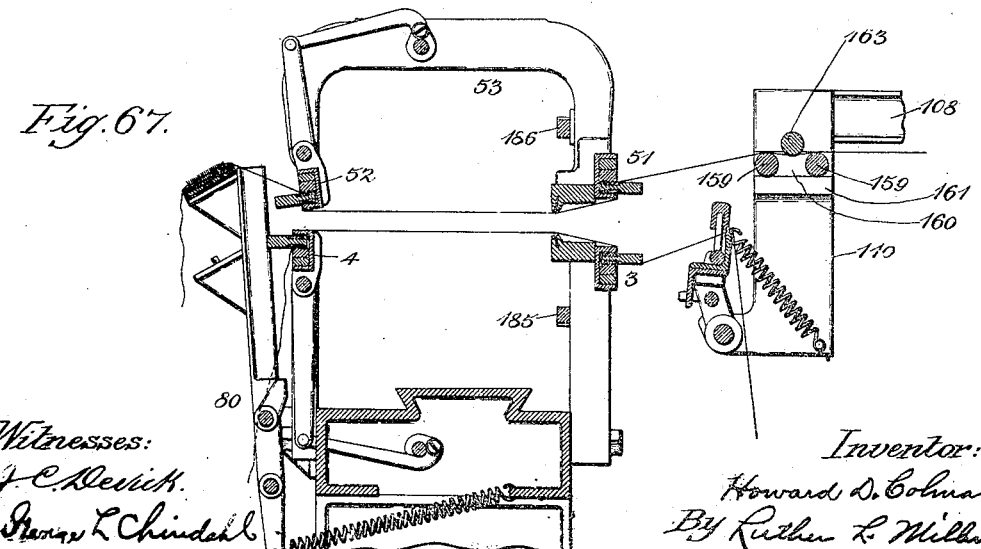

H. D. COLMAN.
WARP TYING APPARATUS.
APPLICATION FILED JULY 12, 1909.
1,082,474.
Patented Dec. 23, 1913.
15 SHEETS—SHEET 15.
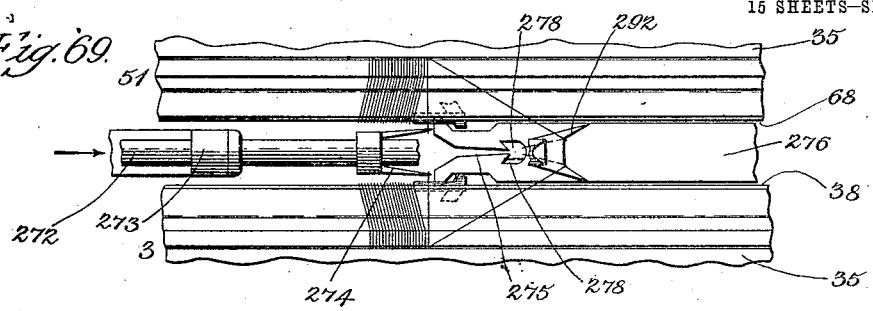
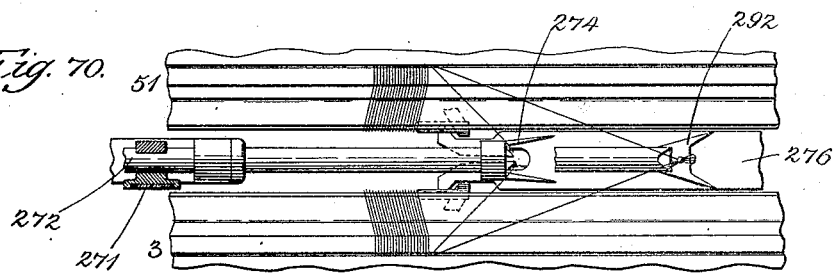
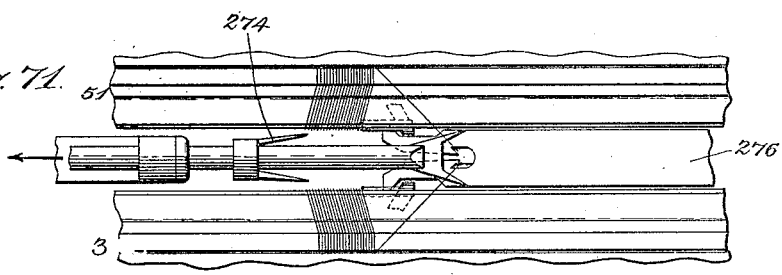
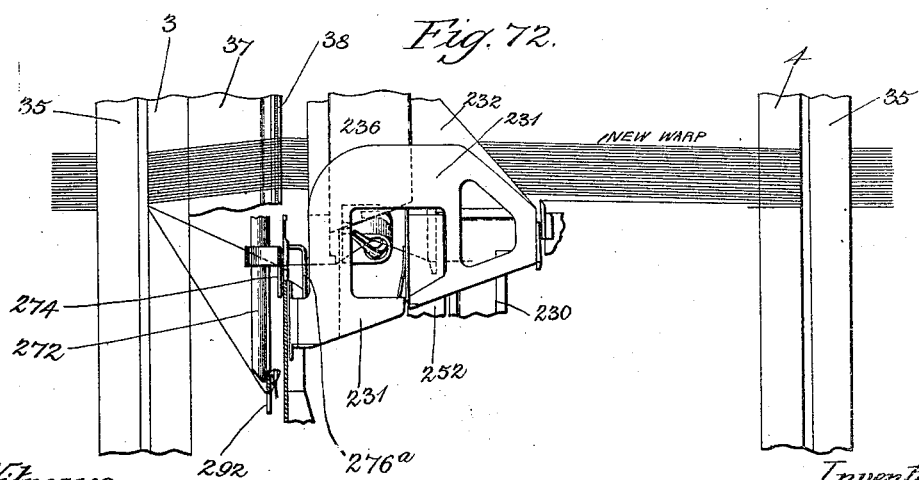

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

WARP-TYING APPARATUS.

1,082,474.      Specification of Letters Patent.      Patented Dec. 23, 1913.

Application filed July 12, 1909. Serial No. 507,233.

*To all whom it may concern:*

Be it known that I, HOWARD D. COLMAN, a citizen of the United States, residing at Rockford, in the county of Winnebago and State of Illinois, have invented certain new and useful Improvements in Warp-Tying Apparatus, of which the following is a specification.

The object of this invention is to produce apparatus for tying together the ends of two warps.

The present embodiment of the invention comprises a frame for supporting a loom beam and a section of a warp brought from a loom, with the harnesses, reed and drop wires in place on such warp section, and a machine for tying the warp on the loom beam to the section of warp. The machine is mounted upon a truck so that after portions of the two warps have been tied together, the machine may be moved along the front of the warp-supporting frame, other portions of the warps placed in the machine, and the threads thereof united. These operations are repeated until all of the threads of one warp have been united to the corresponding threads of the other warp.

In the accompanying drawings, Figure 1 is a transverse section through a warp-tying machine and a warp-supporting frame embodying the features of my invention. In this figure the tying-in mechanism proper is omitted. Fig. 2 is a front elevation of the warp-supporting frame, with a loom beam in position thereon. Fig. 3 is a front elevation of the warp-tying machine with the tying-in mechanism removed. Fig. 4 is a transverse section through the warp-tying machine, the tying-in mechanism being omitted. Fig. 5 is a side elevation of the tying-in mechanism and a carriage upon which it is mounted. Fig. 6 is an elevation of said tying-in mechanism and said carriage from the side opposite to that seen in Fig. 5. Fig. 7 is a section on line 7 7 of Fig. 6. Figs. 8 and 9 (Sheet 3) are fragmental views of the warp clamps on the warp-tying machine. Figs. 10, 11 and 12 are detail views of the means for operating said clamps. Figs. 13 and 14 illustrate a portion of the means for placing tension upon the warps. Fig. 15 is a fragmental side elevation showing portions of a clamp for the new warp and a clamp for the old warp, together with a part of the means for movably supporting the clamps for the old warp, and the means for deflecting the warps. Fig. 16 is a view taken from the left-hand side of Fig. 15, with a portion thereof in section. Fig. 17 is a top plan view of some of the parts shown in Fig. 15. Fig. 18 is a section on line 18 of Fig. 15. Fig. 19 is a top plan view of the separator slide and some of the parts carried thereby. Fig. 20 is a section on line 20 20 of Fig. 19. Fig. 21 is a sectional view taken in the plane of dotted line 21 21 in Fig. 19. Fig. 22 is a sectional view in the plane of dotted line 22 22 of Fig. 7. Fig. 23 is a detail view of one of the shear blades. Fig. 24 illustrates one of the thread forks carried by the separator slide. Fig. 25 is a section on line 25 25 of Fig. 19. Fig. 26 is a view of another of the forks carried by the separator slide. Fig. 27 is a view taken in the plane of dotted line 27 of Fig. 7, and illustrating the stumblers and related parts. Figs. 28, 29 and 30 illustrate different positions of the stumblers, selectors and separator blades. Fig. 31 is a section taken substantially in the plane of line 31 of Fig. 7. Fig. 32 is a view taken from the left-hand side of Fig. 31, but with certain portions omitted. Fig. 33 shows the tying-bill, a thread-clamp and a means for restoring the thread-clamp to initial position. Fig. 34 illustrates the action of said restoring means. Fig. 35 is a view taken from the lower side of Fig. 34. Fig. 36 is a detail view of the bracket 256. Figs. 37 and 38 are detail sections of the shear. Fig. 39 is a view of the main shaft with the crank, gear wheel, eccentric and crank pin carried thereby. Fig. 40 is a top plan view of some of the parts shown in Fig. 6. Figs. 41, 42 and 43 illustrate portions of the sensitively-controlled feed. Figs. 44 and 45 represent a means for steadying the action of the feed-controlling means. Figs. 46, 47, 48 and 49 illustate the means for mounting and actuating the thread selectors. Fig. 50 is a fragmental view of a means for supporting the old warp in the warp-supporting frame. Fig. 51 is a section on line 51 51 of Fig. 50. Fig. 52 is a top plan view of some of the devices shown in Fig. 50. Fig. 53 illustrates the action of a latch or locking dog for the old-warp supporting means. Figs. 54 and 55 illustrate the construction and action of a locking device employed in the warp-supporting frame. Fig. 56 illustrates a portion of a means for preventing rotation of the beam containing the new warp. Figs. 57 and 58 are detail views of the knot-tying mechanism. Figs. 59 to 63, inclusive, are views, in a series, representing the operation of the knot-tying mechanism. Fig. 64 is a diagrammatic view of the knot tied by the machine. Figs. 65, 66 and 67 illustrate the operation of mounting the old warp and the new warp in the warp-tying machine. Fig. 68 is a sectional detail showing a joint in one of the clamp-carrying arms. Figs. 69, 70 and 71 illustrate the operation of the forks 274 and 292. Fig. 72 is a partial top plan view illustrating the manner in which the threads are positioned with relation to the knot-tying mechanism, and the manner in which the knotted ends are removed.

The form of warp-tying machine herein shown comprises a bed 1 which is mounted upon a suitable form of truck 2. Any preferred means may be employed to prevent undesired movement of the truck, as, for example, a brake 2ª. The new warp is supported in the warp-tying machine by clamps 3 and 4, the clamp 3 being fixed to posts 5 rising from one side of the bed. It is desirable that the threads of the warp be under tension while they are being operated upon by the machine; the clamps 3 and 4 are therefore adapted to grip the threads tightly and the clamp 4 is arranged to be moved away from the clamp 3 to stretch the warp. The clamp 4 is rigidly attached to the upper ends of levers 6, which levers are secured, near the clamp 4, to a shaft 7 mounted in bearings in the upper ends of posts 8 fixed to the bed 1 (Figs. 3 and 4). The lower ends of the levers 6 are connected by means of links 9 with cranks 10 fixed upon a shaft 11 extending longitudinally of and within the bed 1. The links 9 and cranks 10 are so arranged that the points of pivotal connection of the cranks and the links may be thrown slightly "over center" in order to lock the clamp 4 in the position shown in Fig. 4. Upon one end of the shaft 11 is fixed a hand lever 12 (Figs. 13 and 14, Sheet 3) by means of which the shaft may be rocked to stretch the warp. The operative or tensioning position of the clamp 4 is invariable, being determined by the stopping of the links 9 against the shaft 11. The inoperative position of said clamp is determined by an adjustable stop on the shaft 11 adapted to engage with a fixed stop 13 on the adjacent end of the bed when the clamp 4 is swung inwardly. The adjustable stop consists of a segmental plate 14 loosely mounted on the shaft 11 and having an arcuate slot 15 therein through which a clamping bolt 16 extends, said bolt being carried by an arm 17 fixed to the shaft. On the plate 14 is a stop shoulder 18 adapted to stop against the pin 13. The position of the stop shoulder 18 with relation to the shaft 11 may be varied by adjusting the position of the bolt 16 in the slot 15, thereby permitting of a variation of the tension placed upon the warp.

The clamps 3 and 4 are identical in construction. Each consists of a channel bar 19 (Figs. 9 and 10) containing a clamping bar 20 slidable transversely of the channel bar and held therein by means of overlying flanges 21. On the inner surface of one flange of the channel bar is a longitudinal rib 22, the adjacent side of the clamping bar 20 being provided with a similar rib 23. The opposite side of the clamping bar 20 has locking inclines 24 thereon upon which similar inclines 25 on an operating bar 26 are adapted to ride. The means for longitudinally sliding the operating bar 26 consists, as herein shown, of a hand lever 27 (Figs. 11 and 12) pivoted at 28 upon the rear side of the channel bar 19 and connected with the operating bar through the medium of a link 29. Said link is pivotally connected at 30 with the hand lever and at 31 with a block 32 rigidly attached to the inner side of the operating bar, the channel bar being slotted at 33 to accommodate the block 32. In order that the degree of pressure exerted upon the threads by the clamp may be regulated, the block 32 is adjustably mounted upon the operating bar 26. The contacting faces of the block and the operating bar are preferably serrated, as shown in Figs. 11 and 12, and said parts are secured together by means of screws 34 extending through elongated openings in said block.

The threads are inserted into the clamps 3 and 4 by means of insertion bars 35 (Fig. 4), said bars, in the form herein shown, having shallow grooves in their opposite sides in which strips 36 of rubber or other suitable resilient material are cemented or otherwise suitably secured. Warp threads lying in a sheet are inserted into one of the clamps by pressing an insertion bar 35 against the sheet of threads and into the space between the clamping bar 20 and the opposite flange of the channel bar 19. When the hand lever 27 is thrown into the position indicated in Fig. 11, the operating bar 26 is moved to force the clamping bar 20 against the insertion bar, thereby securely clamping the threads. The threads are not confined in the clamp by the pressure of the insertion bar, but by pressing the clamping bar against the threads and the insertion bar.

A bar 37 (Fig. 4) secured to the upper ends of the posts 5, extends longitudinally of the bed 1 and has a groove therein in which is slidably mounted a metallic ribbon 38 over which a sheet of threads secured in the clamps 3 and 4 extends. The edge of the ribbon contacted by the sheet is roughened or finely serrated, as indicated on an exaggerated scale in Fig. 72. The ribbon 38 is arranged to be slid longitudinally in its groove, for the purpose of deflecting the sheet of threads, as in Fig. 72, by means of a rock shaft 39 (Figs. 15 and 16) having at one end a crank arm 40 carrying a pin 41 which extends into an elongated opening 42 in the ribbon. On the opposite end of the shaft 39 is fixed a hand lever 43 carrying an adjustable locking member 44 adapted to engage with a locking dog 45 pivoted at 46 on a portion fixed with relation to the bar 37 and the clamp 3. As herein shown, the adjustable locking member consists of a plate pivotally mounted upon the shaft 39 and carrying a shoulder 47 adapted to lie behind the bent forward end of the locking dog 45. Said plate is adjustably connected with the hand lever 43 by means of a clamping plate 48, said plates being rabbeted, as indicated in Fig. 18, to provide a portion on the clamping plate overlying a portion of the locking plate. The clamping plate 48 is moved to clamp the locking plate 44 between itself and the side of the hand lever 43 by means of a screw 49. When a sheet of threads secured in the clamps 3 and 4 is to be deflected, the hand lever 43 is rocked in the direction indicated by the arrow in Fig. 15 into the position said lever is shown to occupy in said figure, whereupon the dog 45 drops behind the shoulder 47 and locks the ribbon 38 against accidental movement into its inoperative position. The amount of deflection may be varied as circumstances may require by adjusting the plate 44 upon the hand lever 43. The dog 45 is provided with a handle 50 by means of which the dog may be withdrawn from the shoulder 47.

The old warp is arranged to be held in clamps 51 and 52 mounted upon a carriage 53. Said carriage is provided with rollers 54, 55, 56 and 57 (Figs. 3 and 15). The rollers 54 and 55 at opposite ends of the carriage are adapted to stand upon grooved tracks 58 and 59 fixed to the bar 37. The rollers 56 and 57 stand upon tracks 60 and 61, the former being secured to one end of the clamp 4, and the other being formed upon an angular bracket 62 fixed to the bed of the machine.

The clamps 51 and 52 are substantially identical in construction with the clamps 3 and 4. At each end of the clamps 51 and 52 is a spring 63 (Fig. 8) which tends to hold the clamp open. The clamp 52 is mounted upon swinging arms 64 and is arranged to be moved by means of a shaft 65 and hand lever 66 (Fig. 3), as in the case of the clamp 4. The clamp 51 is stationary with relation to the frame of the carriage. 67 is a bar fixed to the carriage frame and supporting a slidable serrated metallic ribbon 68. Said ribbon is arranged to be moved by means of a shaft 69 (Fig. 15), a crank arm 70 carrying a pin 71 engaging in an elongated opening 72 in one end of the ribbon, and a hand lever 73 fixed upon the shaft 69. The lever 73 is arranged to be locked to secure the ribbon 68 in inoperative position by means of a finger 74 pivoted at 75 upon a block 76. The finger 74 is adapted to be swung into place behind the hand lever 73 to prevent movement of said lever in one direction, and may be swung to one side to permit of moving said lever. The swinging movements of the finger 74 are limited by a stop pin 77 (Fig. 17) engaging shoulders 78 on said finger. The amount of deflection given the sheet of threads by the ribbon 68 may be varied by adjusting the position of the block 76, said block being secured in place by means of a screw 79 extending through an elongated opening in said block.

Means is provided for yieldingly supporting an auxiliary thread-holder adjacent to the clamps 4 and 52. (See Figs. 3, 4 and 65.) Said means, in this instance, consists of two arms 80 mounted upon a rock shaft 81 which is carried in bearings upon one side of the bed 1. The lower portions of said arms are rigidly connected together by means of a rod 82, and the lower ends of said arms are yieldingly connected to a stationary part of the machine by means of springs 83. In order that the upper portions of the arms 80 may be placed out of the way after they have served their purpose, each of said arms, in this instance, is formed in two sections 80$^a$ and 80$^b$. The section 80$^a$ is fixed upon the shaft 81, the section 80$^b$ being loose upon said shaft. Upon the upper end 84 of the section 80$^b$ is a spring detent 85 (Fig. 68) adapted to coöperate with a projection 86 upon the section 80$^a$ for the purpose of releasably connecting said sections together in line. When so connected together, the projection 86 lies between the upper end 84 of the section 80$^b$ and the spring detent 85, as shown in Fig. 68. When it is desired to withdraw the sections 80$^a$ to permit of subsequent operations, the operator grasps one of the sections 80$^a$ and draws said section downwardly into the position illustrated in Figs. 3 and 4, thereby breaking the joint 85 86 in both of the arms.

The auxiliary thread-holder used in connection with the arms 80 is, in this instance, in the form of a brush consisting of a bar 87 having secured thereon card cloth or other suitable material 88. Said bar is arranged to be mounted on brackets 89 and 90 formed on the arms 80. Each of said brackets has a pin 91 thereon adapted to enter an opening (not shown) in the bar 87 for releasably retaining said bar in place upon the arms 80.

The old warp and the new warp to be tied together may be supported upon a suitable frame, such as the one shown in Figs. 1 and 2. In this instance, said frame comprises two base pieces 92 rigidly connected together by means of tubular rods 93 and 94, and bars 95 fixed at their lower ends to said base pieces and connected at their upper ends in a suitable manner to a longitudinal bar 96. The loom beam A containing the new warp is supported by the forked upper ends of two posts 97 which are adjustable longitudinally of the rods 93 to accommodate beams of different lengths, and which posts may be fixed in adjusted position by means of clamping screws 98.

Suitable means may be provided for preventing accidental rotation of the beam. I have herein shown a shoe 99 covered with felt or other suitable material and fixed to the upper ends of arms 100, which arms are fixed upon a rock shaft 101 journaled in the base pieces 92. A hand lever 102 is pivotally mounted upon one end of the rock shaft 101 and carries a tooth 103 adapted to engage with a locking sector 104 fixed to the adjacent bars 95. The hand lever 102 is normally under tension which holds the tooth 103 in engagement with the sector. When it is desired to adjust the position of the hand lever, said lever may be flexed outwardly to release it from the sector 104. Rigidly fixed upon one end of the rock shaft 101 which carries the hand lever 102 is an arm 105 which is connected with the hand lever by a coiled spring 106, (Figs. 2 and 56). It will be seen that the construction just described provides means for yieldingly pressing the shoe 99 against the beam, the degree of pressure being variable by moving the hand lever 102 along the sector 104. The pressure may be partially or wholly relieved by moving the hand lever to the right (Fig. 1). A lug 107 on the arm 105 is arranged to be engaged by the hand lever 102 when the latter is moved sufficiently far toward said arm.

Fixed to the inner sides of the bars 95 are two horizontal channel bars 108 arranged with their flanges facing inwardly. Braces 109 extend between the base pieces 92 and the rear ends of the channel bars 108. To the forward ends of the bars 108 are fixed brackets 110 in which is supported a rock shaft 111. Said shaft has fixed thereon two arms 112 on which is rigidly mounted an angular bar 113 formed, in this instance, of two angle irons secured together as shown in Fig. 65. Coiled springs 114 connected to the ends of the bar 113 tend to tilt said bar rearwardly into the position represented in Fig. 65. A rock shaft 115 is mounted in the arms 112 and has fixed upon its ends outside of said arms locking dogs 116 (Figs. 54 and 55) adapted to engage projections 117 upon the adjacent brackets 110. The rearward tilting movement of the bar 113 under the influence of the springs 114 is limited by the engagement of the portions 118 of the dogs 116 with the portions 119 of the brackets 110. A coiled spring 120 connected at one end with the locking dog and at its other end with the bracket tends to hold said dog either in or out of locking position, as shown in Figs. 54 and 55. 121 are projections upon the dogs 116 by means of which said dogs may be manually thrown "over center" into or out of locking position.

While a beam is being transferred from the slasher to the warp-supporting frame, the end of the warp is held in any suitable way so as to keep the threads in substantial parallelism, as, for example, by means of a comb 122 put on at the slasher.

123 is a cap or backing for the comb. When the beam has been placed in position upon the posts 97, the comb 122 is passed upwardly behind the rock shaft 111 and the bar 113 and the comb 122 set upon the bar 113. The ends hanging over the forward side of the bar 113 are now divided into a number of groups or divisions, each of which may contain approximately the same number of ends, the number of divisions depending upon the capacity of the warp-tying machine and with the width of the warp. The threads of each division are then secured together in a suitable way, as by tying them into a bunch, as shown at 124 in Fig. 2.

The section of the old warp brought from the loom terminates in a small piece of fabric cut from the cloth last woven, and has thereon the harnesses B and the reed C, and the drop wires, if any, the ends of the warp threads being tied in a knot behind the harnesses or simply twisted together in a roll. The strip of cloth is pressed on to pins 125 (Fig. 2) carried by a bar 126; said bar extending longitudinally of the warp-supporting frame and being fixed at its ends to arms 127 (Figs. 50 and 52) formed upon slides 128 which are mounted in the channel bars 108.

129 is a flange secured to each channel bar to retain the slides 128 therein. The pin bar 126 is arranged to be locked against movement by means of two dogs 130, each pivotally mounted at 131 upon one of the slides 128 and adapted to engage teeth 132 fixed upon the channel bars 108. A plurality of teeth 132 is provided so that the operator may set the pin bar in any of several different operative positions.

Each dog 130 may be supported out of operative position by a detent 133 pivoted on the slide 128, the inclined upper end of which is arranged to support a pin 134 fixed in said dog. A spring 135 tends to hold the detent 133 in position to support said pin. 136 is a pin fixed in the slide 128 for limiting the spring-actuated movement of the detent. The means herein shown for lifting the dog 130 out of engagement with one of the teeth 132 and for returning said dog into operative position comprises a rock shaft 137 carried by the slides 128, and hand levers 138 fixed upon said shaft. Each of said hand levers has two projections 139 140 thereon, between which extends the rear end 141 of the adjacent locking dog 130. When one of the hand levers 138 is tilted to the right (Fig. 50) the projection 139 will depress the rear end of the locking dog 130 and elevate said dog out of engagement with a tooth 132 and force the pin 134 past the detent 133. Said detent, springing in beneath the pin 134, will support the dog in inoperative position, as shown in Fig. 53. When the hand lever is swung to the left (Fig. 50) the projection 140 on said hand lever will engage the rear end of the locking dog and depress said dog into position to engage with one of the teeth 132, the detent 133 yielding to permit the pin 134 to pass downward.

The old warp is arranged to be drawn rearwardly to pull the knots through the heddle eyes, as will appear more fully hereinafter, by means herein shown as comprising two weights 142 attached to cables 143 which pass over sheaves 144 attached to the rear of the warp-supporting frame, the forward ends of said cables being secured to the rock shaft 137, as shown in Figs. 1, 50 and 52. 145 is a handle fixed upon the rear side of the pin bar 126 by means of which the operator, standing between the rear portions of the channel bars 108, may control the rearward movement of said pin bar, and return the pin bar to the front of the frame.

The reed C may be supported by suitable means, such as a shelf 146 secured to the pin bar 126 and having a groove therein to receive one edge of the reed. The upper edge of the reed is engaged by a plurality of clips 147 fixed upon a tube or sleeve 148, which sleeve is free to turn upon the shaft 137. The reed is secured in the warp-supporting frame by placing one edge of the reed in the groove of the shelf 146 and dropping the clips 147 into engagement with the upper edge of said reed. If desired, the pin bar 126 may be connected at intervals with the sleeve 148 by means of arms 149.

The means herein shown for supporting the harnesses B comprises arms 150 supported in brackets 151. Each of the arms 150 is horizontally movable in its bracket, the horizontal movement of the arm being limited by a pin 152 fixed in the bracket and extending through an elongated opening 153 in said arm. To permit of a vertical adjustment of the arms 150, the brackets 151 are provided with stems 154 lying within socket members 155 and clamped in any desired position by means of a clamping screw 156. A pin 157 extending through the stem 154 with its ends lying in vertical grooves 158 in said socket member prevents the bracket from falling from said socket. The socket members 155 are slidably mounted upon the bar 96, whereby the arms 150 may be adjusted laterally, vertically and longitudinally.

Two spaced parallel bars 159 are fixed at their ends in blocks 160. Said blocks are removably supported in the warp-supporting frame upon flanges 161 formed upon the inner faces of the brackets 110. Pins 162 fixed in the flanges 161 are adapted to extend through openings in the block 160 to hold the bars 159 from accidental displacement.

As hereinbefore stated, when a section of the old warp is received at the warp-supporting frame, the harnesses and the reed are in position thereon. Assuming the bars 159 to be removed from the warp-supporting frame, and the pin bar 126 to be in its forward position as shown in Fig. 1, the reed is placed upon the shelf 146 and secured thereon by the clips 147, and the harnesses suspended upon the arms 150. The bars 159 are now replaced, and the sheet of old warp-threads laid thereover. The threads are next divided into groups and each group tied into a bunch, as in the case of the new warp. Both warps are now ready to be secured in the clamps of the warp-tying machine. The warp carriage having been lifted off the tracks 58, 59, 60 and 61, the warp-tying machine is placed in front of the warp-supporting frame, as shown in Fig. 1, and in front of the portion of the warps to be first tied together. The operator now swings the arm-sections $80^a$ upwardly into the position shown in Fig. 65, and places the auxiliary thread-holder 87 upon the brackets 89. The operator then unties the knot into which the adjacent portion of the new warp had previously been tied, and, taking a number of the threads in one hand, brushes them into substantial parallelism by means of a brush of any suitable character, and secures the brushed-out ends by pressing them down upon the card cloth 88. This operation is repeated until there has been formed a sheet of substantially parallel threads extending from the bar 113 across the clamp 3, the ribbon 38 and the clamp 4 to the thread holder 87, which sheet may be as wide as the machine is capable of handling at one time. The sheet of threads is then secured in the clamps 3 and 4 by pressing insertion bars 35 against said sheet and into the clamps.

The slack or supply of reserve thread permitting the sheet to enter the clamp 3 is obtained through the tilting forward of the bar 113 against the tension of the springs

114, as indicated in Fig. 66. Similarly the slack or reserve necessary to enable the sheet to enter the clamp 4 is obtained through the tilting rearwardly of the upper ends of the arms 80, such tilting permitting the thread-holder 87 to move nearer the clamp 4. After the insertion bars have been placed in the clamps, said clamps are closed by operating the levers 27. The thread-holder 87 is then pulled from the threads and placed upon the brackets 90 in readiness for use in connection with the old warp.

The old warp is placed in the warp-tying machine in substantially the same manner as in the case of the new warp. The operator unties a bunch of ends of the old warp, brushes the ends out into substantial parallelism and secures the ends in the thread-holder 87. A weight in the form of a bar 163 of about the same length as the width of the brushed-out sheet of old-warp ends is then placed upon the portion of the sheet extending across the bars 159, said weight drawing the sheet downward between said bars, as shown in Fig. 66, thereby forming a reserve supply of thread to be given up when the sheet is inserted into the clamp 51. The warp carriage 53 is then placed upon its supporting tracks, and the sheet of old-warp threads inserted into the clamps 51 and 52. The arms 80 yield rearwardly when the sheet of threads is inserted into the clamp 52. The clamps 51 and 52 having been closed, the thread-holder 87 is stripped from the threads of the old warp. The sheets of new and of old warp secured in the machine are now tensioned by operating the hand levers 12 and 66 to swing the clamps 4 and 52 forwardly. Said sheets also are deflected by operating the levers 43 and 73. It will be understood that, if desired, each sheet may be stretched and deflected immediately after it has been secured in its clamps. The arm sections 80$^a$ may now be swung downwardly into the position indicated in Fig. 4 so as to be out of the way of the crank by means of which the tying-in mechanism is driven.

The tying-in mechanism proper is mounted upon a carriage or slide 164 (Figs. 4 and 5) arranged to move from one end of the bed 1 to the other, or, in other words, transversely of the warps, upon a gib 165. In this instance, the warp-tying machine is arranged to be manually driven by means of a hand crank 166 fixed upon one end of a shaft 167, the latter being supported in a post 168 rising from the carriage 164. The opposite end of the crank shaft 167 has fixed thereto a spur gear wheel 169 which meshes with a gear wheel 170 fixed upon the main shaft 171 (Fig. 39). The latter shaft is supported in a post 172 (Figs. 31 and 32). The crank shaft 167 is supported at such height that when the slide 164 moves along the gib 165 said shaft will pass through the space between the warp clamps 4 and 52. As the threads of the two warps are successively tied together, the carriage 164 is advanced along the bed 1 so as to keep the tying-in mechanism in operative relation to the foremost thread of the lower or new warp.

The warp carriage 53 stands upon the tracks 58, 59, 60 and 61 with freedom to move slightly thereon, and means is provided for feeding the carriage 164 with relation to the warp carriage 53 so as to keep the tying-in mechanism in operative relation to the foremost thread of the upper or old warp.

The means for moving the carriage 164 with relation to the new warp and the old warp comprises a lever 173 pivoted at a point between its ends upon a pivot 174 on the post 172 (Figs. 6 and 32) and a similar lever 173$^a$ pivoted at 175 upon a standard 176 fixed to the carriage 164. The rear ends of the levers 173 173$^a$ are connected by means of the rods 177 and 178 with an eccentric 179 and a crank pin 180, respectively, on the main shaft 171. Each of the levers 173 173$^a$ comprises an arm 181 upon which is pivotally mounted a feed dog 182 183. Springs 184 tend to hold the feed dogs in engagement with ratchet feed bars 185 and 186, the feed bar 185 being fixed to the posts 5 and the feed bar 186 being rigidly mounted upon the warp carriage 53. As shown in Figs. 6 and 39, the eccentric 179 and the crank pin 180 are diametrically opposed to each other, consequently as the main shaft 171 is rotated, the levers 173 173$^a$ will be rocked in opposite directions to cause synchronous reciprocation of the feed dogs 182 and 183.

It will be seen that if the feed dogs 182 and 183 are permitted to engage the feed bars 185 and 186 during every reciprocation of said dogs, the tying-in mechanism will be regularly advanced step by step with relation to both warps, and that the rate of advance with relation to one warp will be the same as the rate of advance with relation to the other warp. The threads of a warp, however, are not uniformly spaced apart; consequently it is necessary that the relative feed movements between the tying-in mechanism and the warps shall be properly related to the spacing of the threads of the warps. I therefore provide means for sensitively controlling the action of the feed dogs 182 and 183, which means will next be described.

A feed-controlling lever 187 (Fig. 6) is fixed upon a shaft 188 which is mounted in bearings 189 and 190 (Fig. 7). The upper end of said controlling lever is bent to extend around to the rear side of the selector (to be hereinafter described) for the new warp, and close to the ribbon 38, the end of said lever lying in the plane of the new warp. An arm 191 is secured upon the shaft 188 and extends into position to engage the end of a finger 192 fixed to the feed dog 182. A coiled spring 193 tends to swing the feed-controlling lever 187 against the foremost thread of the new warp and to raise the free end of the arm 191 out of engagement with the finger 192. Pins 194 fixed upon the arm 181 define the extreme limits of the oscillatory movements of the lever 187 and the arm 191. When a thread of the new warp is in position to be taken by the selector for said warp, the upper end of the feed-controlling lever 187 lies in contact with said thread and the free end of the arm 191 engages the finger 192, as shown in Fig. 6, thereby changing the movement of the point of the dog 182 from a substantially straight line to a curved path and thus preventing the feed dog 182 from engaging the feed bar 185. The tying-in mechanism consequently will not be advanced with relation to the new warp. In the event, however, that there is no thread of the new warp in position to be engaged by the new-warp selector, the spring 193 tilts the controlling lever 187 and raises the rear end of the arm 191, thereby permitting the spring 184 to draw the feed dog 182 against the feed bar 185. On the next movement of the feed dog, from left to right (Fig. 6), said dog will engage a tooth of the feed bar and the tying-in mechanism will be advanced to bring the new-warp selector into operative relation with the foremost thread of the new warp.

195 is the feed-controlling lever for the old warp. (See Figs. 6, 41 and 43.) It is supported by a bracket 176ª attached to the standard 176. Fixed with relation to said lever is an arm 196, the rear end of which is adapted to engage a finger 197 upon the feed dog 183 for the purpose of controlling the engagement of said dog with the feed bar 186. Gravity tends to swing the feed-controlling lever 195 toward the old warp and to withdraw the arm 196 from engagement with the finger 197. The extreme limits of the swinging movements of the lever 195 and the arm 196 are determined by stop pins 198. When the foremost thread of the old warp is in position to be taken by the old-warp selector, the feed dog 183 is prevented from engaging the feed bar 186. In such an event, the warp carriage 53 should remain stationary with relation to the tying-in mechanism, and in order to insure this result in case the feed dog 182 should act, I provide means for frictionally locking the warp carriage to the tying-in mechanism. As herein shown, said locking means consists of a dog 199 supported upon the bracket 176ª and having an arm 200 to which a spring 201 is attached. The spring 201 presses the dog 199 against the feed bar 186 with sufficient force to cause the warp carriage 53 to move with the tying-in mechanism when the latter is advanced by the dog 182 and the dog 183 does not operate. When, however, the foremost thread of the old warp is not in position to be taken by the selector for said warp, the feed dog 183 is permitted to engage the feed bar 186 and move the warp carriage 53 with relation to the tying-in mechanism.

It will be seen that the locking dog 199 acts as a brake tending to prevent improper forward movement of the tying-in mechanism with relation to the old warp. In order to prevent such improper movement of the mechanism with reference to the new warp, I provide a dog 202 mounted on a post 203 rising from the carriage 164 and pressed against the feed bar 185 by a spring 204 acting upon an arm 205 fixed to said dog.

To prevent trembling or excessive vibration of the feed-controlling levers 187 and 195 tending to interfere with the proper action of the feed, I provide for each of said levers a dash-pot device arranged as follows: On the slide 164 and on the lower side of the bracket 176ª are cups 206 (Figs. 44 and 45) in which is a quantity of suitable oil. A plunger 207 fitting each cup 206 very loosely is fixed by means of an arm 208 to the shafts of the feed-controlling levers 187 and 195. As will be seen, the oscillation of the feed levers will move the plungers 207 in the cups 206, the viscosity of the oil in said cups tending to retard the action of said feed levers.

The warp threads are freed from engagement with the serrated ribbons 38 and 68 and carried into position to be operated upon by succeeding mechanisms by means of selectors 209 (Figs. 6, 7 and 47), pivotally supported in yokes 210 formed upon one end of each of the levers 173. By said levers the selectors 209 are given a synchronous reciprocatory movement toward and away from each other, across the planes of their warps. Each selector is set into a socket 211 fixed upon an oscillatory shaft 212 mounted in the yoke 210. A coiled spring 213 encircles the selector shaft 212 and tends to swing the selector toward the body of warp threads, one end of said spring entering an opening in the socket 211 and the other end of said spring being placed in an opening in a pin 214 set into the face of an adjusting disk 215 loosely mounted upon the stud upon which the selector shaft turns. The adjusting disk 215 is turned to place more or less tension upon the spring 213 as may be necessary in the operation of the machine, and is clamped in adjusted position against the adjacent yoke-arm by means of a clamping plate 216, through an opening in which plate a clamping screw 217 extends, said screw entering a threaded opening in said yoke-arm.

By means of a cam block 218 fixed in the carriage frame and adapted to be engaged by an arm 219 extending from the socket 211, the point of the selector 209 is given the desired path of movement. In the present instance I endeavor to impart to each selector a nearly vertical movement to free the selected thread from its ribbon, then a rearward movement, and finally a substantially vertical movement. The two threads are thus moved toward each other and away from the sheets of warp threads. At the instant that this occurs in the operation of the mechanism, and as the selectors continue to push the threads toward one another, two thread-separating devices move forward, one passing between each of the selected warp threads and the sheet of threads from which the selected thread was taken, thus fully freeing said selected threads from their warps. These thread-separating devices will next be described.

At the forward end of the carriage 164 are two supporting arms 220 (Figs. 5, 6 and 22) to which is fixed a bracket comprising the securing portion 221 and the arms 222 and 223. A slide 224 arranged to be reciprocated longitudinally of the carriage and in line with its movement over the bed 1 is supported in ways 225 and 226 (Fig. 22) upon the arms 220 and in a guideway 227 (Fig. 32) in the post 172. The slide 224 is reciprocated, in this instance, by means of a crank arm 228 fixed to one end of the main shaft 171 and connected with the slide through the medium of a rod 229.

To the upper side of the slide 224 is secured a bracket 230 (Fig. 20) to which are fixed two parallel separator blades 231 and 232 (Figs. 19, 21 and 72). In Fig. 19, the upper separator blade is omitted. The thread-engaging edges of said blades are inclined from a right angle with the line of their reciprocatory movement. Between said blades and fixed rigidly thereto are two forks 233 and 234 (Figs. 19, 21, 24 and 26). Adjacent to the fork 234, but extending forwardly therefrom, are wings 235. These wings are fixed upon the side edges of the separator blades 231 232. The separating action of the wings 235 follows in the operation of the machine immediately after that of the selectors 209, the advancing points of the wings intervening between the selected threads and the body of warp threads as soon as said selectors have pushed said threads far enough out of the plane of the body of warp threads to permit the insertion of said points. The wings follow the selectors so closely that the selected thread barely passes inwardly of the point of the advancing wing. A thread adhering to or following the selected thread will thus be separated from said selected thread by the wing and held outwardly of the blades. The separation of the remainder of the length of the selected threads held in the warp clamps is accomplished by means of the separator blades 231 and 232.

The separator blade 232 comprises a yielding section 236 (Figs. 7, 20, 21 and 25) which is made necessary by the fact that the knot-forming mechanism lies in the path of movement of said lower blade. The section 236 is slidable longitudinally of said blade and is normally held in its forward position by an arm 237 pivoted upon a bracket 238 fixed to the relatively stationary arm 222. The free end of the arm 237 carries a roller 239 which bears against the rear end of the sliding section 236. A spring 240 holds the roller 239 against the sliding section and tends to move said section into its forward position.

241 is a portion upon the sliding section 236 which determines the forward position of said sliding section by contacting with the edge of a web portion 242 of the blade 232 (Figs. 19 and 20). When the separator blades approach the knot-forming mechanism, the travel of the yielding section 236 is arrested by impingement upon the stationary portion 236ᵃ (Figs. 7 and 59). In Fig. 72, the separator blades are represented in substantially their foremost position.

The selected and separated threads are severed to provide loose ends for the tying operation by means of a shear blade 243 (Figs. 19, 21 and 23) fixed to the bracket 230 and co-acting with a shear blade 244 (Fig. 7) carried by the arm 222. To obviate the extreme accuracy of adjustment necessary in the use of fixed shears, I have made the shear member 244 yielding and have provided the shear member 243 with a guide portion 245 adapted to engage the yielding shear member and move it into position to bring the two shearing edges into coöperative relation with each other. The yielding shear member 244 is carried upon an arm 246 which is pivoted at 247 to a bracket 248 fixed to the arm 222. (See Figs. 7, 37 and 38). 249 is a stop on the shear arm 246 adapted to engage a stop 250 on the bracket 248. A spring 251 normally holds the stop 249 against the stop 250. A moment before the threads are severed by the shear blades 243 and 244 said threads are clamped by means to be next described.

Referring to Figs. 7, 31, 32 and 33: 252 is a square tube rigidly supported in the post 172. In one wall of said tube is fixed a plate 253 the outer end of which constitutes an abutment or clamp member. To the opposite wall of the tube 252 is fixed a plate 254 somewhat wider than the height of the tube, and in said plate is formed a throatway 255. Fixed to the bracket 230 is a bracket 256 having guideways 257 (Figs. 20 and 36) therein, in which guideways is mounted a slide 258 carrying at its forward end a clamping jaw 259 (Figs. 33 and 34) which is pivoted in order that it may clamp against the plate 253, with equal pressure, a new-warp thread and an old-warp thread of different sizes. The slide 258 is frictionally held against movement in its guideways by means of a coiled spring 260 extending between said slide and an arm 261 pivoted at one end of said slide and at its other end bearing upon one face of the bracket 256. The forward portion of the bracket 256 is formed with a wedging surface 262 against which the free end of the arm 261 presses during the early part of the forward movement of the slide. When the jaw 259 carries the threads against the abutment 253, the slide is stopped. The continuing movement of the separator blades and the wedging surface 262 forces the arm 261 outwardly, and thereby increases the tension on the spring 260. The resistance of the slide 258 to movement in its guideways is thus increased, thereby placing an increased clamping pressure upon the threads at the moment of cutting them. The forward end of the bracket 256 is in the form of a fork 263. During the initial portion of the movement of the separator slide 224, the slide 258 is at the forward end of the bracket 256. As said slide 258 moves forward, the selected and separated threads are clamped between the abutment 253 and the jaw 259. A moment later said threads are severed by the shear 243 244, and the bracket 256 continuing in its forward movement with the separator slide, the forked end 263 of said bracket carries the severed ends into the tube 252, said ends slipping past the clamping jaw 259 as is necessary to permit of such movement, the threads being at the same time inserted into the throatway 255. Upon the return movement of the separator slide 224, the slide 258 is restored to its position near the forward end of the bracket 256 by striking a pin 264 set in the relatively stationary arm 223.

Tension is placed upon the severed ends of the threads during the knot-forming operation by a spring clamping finger 265 (Fig.
31) which is attached to an arm 266, and the free end of which clamping finger presses against the side of the plate 254. The spring finger 265 is moved into and out of position to engage threads extending through the throatway 255 by means comprising a coiled spring 267 and a cam 268, the latter being fixed upon a shaft 269. Said shaft is driven from the main shaft 171 through the medium of a gear 270 fixed on the shaft 269 and meshing with the gear 170.

Referring now to Figs. 7, 19 and 22: Fixed to an arm 271 on the lower separator blade 232 is a rod 272 which is slidably mounted in two guides 273 on the arm 223.
Fixed to the rod 272 is a fork 274 which is alined with the forks 234 and 263. As the forks 234 and 263 bring the selected, separated and severed threads up to the knot-tying mechanism, the fork 274 inserts said threads into a throatway 275 formed in a plate 276 fixed to an arm 277 on the standard 176. The inner end of the throatway is enlarged to form two notches 278 into which the threads spring after being pushed through the narrow portion of the throatway by the fork 274 and wherein they are retained during the operation of tying the knot. The operation of inserting the threads into the notches 278 is illustrated in Figs. 69 and 70. In Figs. 69 and 71 the direction of movement of the rod 272 is indicated by arrows, said rod being at the forward limit of its movement in Fig. 70.

In extending from the notches 278 to the clamp 265 the threads lie across a guard 276ª (Figs. 7 and 58), the object of which guard will appear hereinafter. As the separator slide completes its forward movement, the closed ends of the forks 263 and 234 carry the threads under the point of a rotary tying-bill 279 which at this moment is in its initial position (Fig. 59). The tying-bill may be of substantially the same construction as that illustrated in Patent No. 755,110 issued to me on March 22, 1904. It comprises two jaws 280 carried by the bill shaft 281 (Fig. 58) and an intermediate jaw 282, which jaw is moved with relation to the other jaws by means of a wing 283 which lies within a cam barrel 284, as in the patented construction referred to. In the present instance, however, no shear edges are formed upon the jaws 280 and 282. The bill shaft 281 is rotated by a spiral gear 285 (Fig. 58) on the shaft 269 meshing with a pinion 286 on the bill shaft.

The knot is tightened and stripped from the tying-bill by a rotary stripper hook 287 mounted to revolve in a vertical plane between a plate 288 and a notched plate 289, which plates provide bearing edges across which the threads extend when the stripper hook 287 pulls the threads downward in the space between said plates, as shown in Figs. 58 and 63. Rotation is imparted to the stripper hook 287 from the shaft 269 by intermeshing gears 290 291 (Fig. 57). As the threads are wound about the tying-bill, they slip past the spring clamping arm 265. At about the time the tying-bill takes the position shown in Fig. 62, said clamping arm is rocked by the cam 268 to release the ends of the threads. As the stripper hook 287 draws the threads downward into the space between the plates 288 and 289 the loops of the knot are pulled off the tying-bill onto the united strands and the severed ends, the tying-bill retaining a bight of the threads until the knot has been tightened, whereupon the continuing rotation of the stripper hook causes said bight to be pulled out of the tying-bill. It will be understood that the severed ends of the threads must be of sufficient length to permit of holding them during the formation of the loops. I obviate the necessity for cutting off and disposing of these long ends by tying them into the knot, as just described. When the stripper hook 287 depresses the threads, the guard 276ª prevents the upper thread from being pulled out of its notch 278.

Fixed to the forward end of the rod 272 is a stripper fork 292. During the early part of the forward movement of the separator blades 231 and 232, the stripper fork 292 engages the threads last previously tied together and draws them out of the enlarged rear end of the throatway 275, thereby freeing said ends from the tying-in mechanism.

Should one of the selectors 209 fail to take a thread, mechanism to be next described prevents the separator mechanism from carrying forward to the knotter a thread taken by the other selector, assuming that one thread has been selected. Said mechanism also arrests the separator mechanism when no thread is taken by either selector, thereby giving the operator immediate notice of that fact.

Referring to Figs. 7 and 27: 293 are two "stumblers," one for each warp, said stumblers being pivoted upon an extension 294 on the relatively stationary arm 223. The forward ends of said stumblers are in the form of a hook to engage the forward edges of the separator blades 231 and 232, springs 295 tending to swing the stumblers into position to engage the separator blades. The forward ends of the stumblers are so arranged with relation to the selectors 209 that threads engaged by said selectors will swing the free ends of the stumblers toward each other and out of the path of the separator blades. When a selector "stumbles" or fails to catch a thread, the corresponding stumbler remains in the path of one of the separator blades and thereby arrests the motion of said blades. In the present construction, the stopping of the separator blades stops the entire tying-in mechanism. By swinging the crank 166 backward and forward through a short arc, the operator may enable the stumbling selector to take the thread upon a subsequent trial, and if the thread is so taken, the stumbler is automatically withdrawn from the path of the separator device, as above described, and the normal operation of the machine is resumed.

In order to lock the stumblers 293 in inoperative position when it is desired to run the mechanism without threads, or for any other reason, I provide a slide 296 adapted to be moved against the rear ends of the stumblers and thereby swing the stumblers toward one another, as shown in Fig. 30. The slide 296 is operated by a hand lever 297 (Fig. 7) pivoted at 298 upon the arm 223. The hand lever 297 may be locked in and out of operative position by any suitable means, such as a pin 299 engaging in either of two openings 300.

After all the ends secured in the machine have been tied, the carriage 164 may be manually slid to its initial position adjacent to the bracket 62, the feed dogs 182 183 and the locking dogs 199 202 being first disengaged from the feed bars 185 186 by means to be next described. A vertical rock shaft 301 (Figs. 6 and 7) is mounted in a bracket 302 secured to the standard 176. Upon each end of the rock shaft 301 is fixed a crank arm 303 to which is pivoted a rod 304 which has a slot 305 therein (Fig. 40) through which a stud 306 extends. Each of the rods 304 has pins 307 and 308 thereon to engage the arms 200 205 of the dogs 199 202 and the pins 309 on the dogs 182 183. A spring 310 of sufficient strength to overcome the springs 184, 201 and 204 tends to throw the crank arms 303 to either side of a dead center, and thereby hold the pins 307 and 308 either in or out of operative position. On the upper crank arm 303 is an extension 311 by means of which the shaft 301 may be manually rocked.

After all the threads secured in the machine have been tied, the clamps 3 and 51 are opened and the insertion bars therein removed in order to release the united ends of the two warps. The clamps 4 and 52 also are opened, the waste threads therein removed, said clamps tilted inwardly (rearwardly) by means of the levers 12 and 66, the deflecting ribbons 38 and 68 returned to inoperative position, and the warp carriage 53 lifted off its supporting tracks and laid aside. The warp-tying machine is then advanced along the front of the warp-supporting frame into a position in front of the next division of warp threads to be tied together, and the operations hereinbefore outlined are repeated.

After all the threads of both warps have been united, the tab of cloth on the old warp is pressed onto the pins 125, the comb 122 removed from the warp-supporting frame, and the line of knots drawn through the heddle eyes. The last mentioned operation is performed by operating one of the levers 138 to release the pin bar 126, the operator controlling the rearward movement of said pin bar and the warp under the influence of weights 142. After the knots have been drawn through the harnesses, the operator releases the reed C from the support 146 147 and pushes the reed forward over the knots. The operator then disengages the strip of fabric from the pin bar, the latter moving rearward under the action of the weights 142, until the shoulders 128ᵃ on the slides 128 strike against the stops 128ᵇ. The bars 159 are then removed, the harnesses and the reed placed upon the beam A, and said beam removed from the warp-supporting frame for delivery to a loom.

I would have it understood that the invention is not limited to the details of construction herein shown and described, and that the methods herein set forth of using the apparatus illustrated may be varied. For example, the warp-tying machine may be used for the purpose of tying the end of a warp contained upon a full loom beam to the end of the old warp in a loom, the machine being movable from loom to loom upon the truck 2.

The generic features of the machine disclosed in this application, among which are the sensitively-controlled feed, the means for clamping, stretching and deflecting the warps, the means for selecting, separating, severing, holding and tying the warp threads, the means for removing the united threads from the tying mechanism, and the means for stopping the mechanism when the selecting means fails to take a thread or threads, are claimed broadly in my copending application Ser. No. 208,779, filed May 19, 1904. The sensitively-controlled feed, the means for clamping, stretching and deflecting a warp, and the means for selecting, separating, severing and holding warp threads are disclosed, in another embodiment, in my copending application Ser. No. 317,547 filed May 18, 1906, and are claimed generically in said last mentioned application.

I claim as my invention:

1. The combination of a frame for supporting two warps, and a machine for uniting said warps, said machine being movable as a whole past said warp-supporting frame, and comprising a bed, means for supporting a longitudinal section of said warps above the bed, a uniting mechanism having a traveling movement on said bed, said mechanism comprising a crank shaft for operating it and auxiliary thread-holding means on the side of said machine opposite to said frame, said thread-holding means being withdrawable out of the path of movement of the crank shaft.

2. In a machine for operating upon warp threads, in combination, means for supporting warp threads; operating mechanism; means for causing relative movement between said threads and said operating mechanism comprising a feed bar and means for engaging said feed bar; and means for preventing accidental movement between the warp and the operating mechanism comprising a spring-pressed dog arranged to bear against said feed bar.

3. In a machine for operating upon warp threads, in combination, movable means for supporting warp threads; operating mechanism; means for causing relative movement between said warp-supporting means and said operating means, said moving means comprising a feed bar and means for engaging said feed bar; and means for yieldingly locking said warp-supporting means to said operating mechanism comprising a spring-pressed dog arranged to bear against said feed bar.

4. In a machine for operating upon warp threads, in combination, warp-supporting means; operating mechanism; means for causing relative movement between said warp-supporting means and said operating mechanism comprising a feed bar and a dog adapted to directly engage said feed bar, and means for withdrawing said dog from engagement with said feed bar.

5. In a machine for operating upon warp threads, in combination, warp-supporting means; operating mechanism; means for causing relative movement between said warp-supporting means and said operating mechanism comprising a feed bar and a dog adapted to engage said feed bar; a locking dog adapted to engage said feed bar; and means for withdrawing said dogs from engagement with said feed bar comprising a rod having means thereon for engaging said dogs, and means for longitudinally moving said rod.

6. The combination, with a clamp into which a sheet of threads is to be inserted, of an auxiliary thread-holder yieldingly supported adjacent to the clamp and adapted to hold a sheet of threads extending across the clamp, and arranged to yield toward the clamp when said sheet is inserted into the latter.

7. The combination with a warp-uniting machine having a warp clamp thereon, of an auxiliary warp thread-holder yieldingly supported adjacent to the clamp and adapted to hold a warp extending across the clamp and arranged to yield toward the clamp when said warp is inserted into the latter.

8. The combination with a warp-uniting machine comprising a supporting frame having a warp clamp thereon, of an auxiliary warp thread-holder supported in the supporting frame of the machine adjacent to the clamp and withdrawable out of operative relation to said clamp.

9. The combination with a warp-uniting machine having a warp clamp thereon, of thread-holder-supporting devices pivoted on said machine, and a spring acting upon said thread-holder-supporting means.

10. The combination with a warp-uniting machine having a warp clamp thereon, of thread-holder-supporting devices pivoted on said machine, and a spring acting upon said thread-holder-supporting means, said thread-holder-supporting means being withdrawable out of operative relation to the clamp.

11. The combination, with a warp-uniting machine having a warp thread-holder thereon, of clamp-supporting arms pivoted on said machine, and a spring acting upon said arms, said arms being of sectional construction so that portions thereof may be folded out of operative relation to the clamp.

12. The combination, with a machine for operating upon a plurality of warps, and comprising a clamp for each of said warps, of an auxiliary warp thread-holder, and means for movably supporting said auxiliary warp thread-holder in operative relation to each of the warp clamps.

13. The combination, with a warp-uniting machine having a pair of warp clamps thereon, of warp-supporting devices yieldingly supported at opposite sides of said pair of clamps.

14. A means for supporting a section of a warp having heddles and a reed thereon, comprising means for supporting the heddles, movable means for supporting one end of the warp, and reed-supporting means on said movable means.

15. A means for supporting a section of a warp having heddles and a reed thereon, comprising a heddle-supporting means, a movable pin bar for engaging one end of the warp, and reed-supporting means on said pin bar.

16. In a warp-supporting frame, in combination, means for supporting a loom beam; means located above the beam-supporting means for supporting a section of warp with loom elements thereon; and loom element-supporting means, said warp-section supporting means including removable means in front of the loom-element-supporting means over which said section of warp extends.

17. In a warp-supporting frame, in combination, means for supporting a loom beam; means located above the beam-supporting means for supporting a section of warp with loom elements thereon; and loom-element supporting means, said warp-section supporting means including two bars over which the warp-section may extend, and a weight-bar adapted to rest upon the warp-section between said bars.

18. In a warp-supporting frame, in combination, a member adapted for engagement with the warp; means for slidably supporting said member comprising slides to which said member is rigidly secured; a locking dog mounted on said slide and having a portion by means of which it may be moved; stationary locking means arranged for engagement with said dog; and means for moving said dog into and out of engagement with said stationary locking means comprising a hand lever having projections thereon between which said portion of said dog extends.

19. In a machine for operating upon warp threads, in combination, means for supporting warp threads; operating mechanism; means for causing relative movement between said threads and said operating mechanism comprising a toothed rack bar and a pivoted dog for engaging said rack bar; and means, including a dog engaging said rack bar, for preventing improper movement between the warp and the operating mechanism.

20. The combination with a pair of warp clamps adapted to support a sheet of threads, of an auxiliary thread-holder supported adjacent to one of said clamps and tending to move away therefrom.

21. The combination with a pair of clamps adapted to support a sheet of warp threads, of an auxiliary thread-holder supported adjacent to one of said clamps; and means tending to move said thread holder away from the adjacent clamp, said means permitting said thread-holder to yield toward the clamp when the threads are inserted into the latter.

22. The combination with a pair of clamps positioned one above the other and each adapted to support a sheet of threads, of an auxiliary thread-holder mounted adjacent to said clamps and having means for supporting the threads held in either of said clamps.

23. The combination with a clamp for supporting a sheet of threads, of an auxiliary thread-holding device pivoted at a point beneath said clamp, said thread-holder being arranged to support the threads held in said clamp when the holder extends upwardly from its pivot, and said thread-holder being arranged to swing to extend downwardly from its pivot so as to be out of the way.

24. In a machine for operating upon warp threads, the combination of means for supporting two sheets of threads in horizontal parallel relation; a member for holding either of said sheets of threads prior to its insertion into its supporting means; and means for supporting said thread-holding member in either of t' horizontal positions.

25. The combination with two warp clamps, a device to which the warp threads will cling; and means for interchangeably supporting said device adjacent to either of said clamps.

26. The combination with two warp clamps, positioned adjacent to each other, of an auxiliary thread-holder, and means for interchangeably supporting said thread-holder adjacent to either of said warp clamps, said supporting means being movable to carry said thread-holder away from said clamps into an inoperative position.

27. The combination with a warp clamp, of auxiliary thread-holding means comprising a structure mounted for pivotal movement and having a thread-engaging device thereon; a spring tending to move said structure away from said clamp, said structure being movable to carry said thread-engaging device into an inoperative position.

28. The combination with means for supporting a sheet of warp threads, of an auxiliary thread-holder tending to move away from said supporting means, and a spring dog for holding said thread-holder in its operative position, said holder being arranged to yield toward said supporting means.

29. The combination with means for supporting a sheet of warp threads, of an auxiliary thread-holder pivotally mounted adjacent to said supporting means and tending to swing away therefrom; a catch for retaining said thread-holder in its operative position, said thread-holder being arranged to yield toward said supporting means, and said catch being operable to permit said holder to swing away from said supporting means and into an inoperative position.

30. The combination with means for supporting two sheets of warp threads adjacent to each other, of auxiliary thread-holding means, including a thread-holder having two operative positions for supporting the respective sheets of threads.

31. The combination with two pairs of clamps arranged to support two sheets of warp threads in horizontal parallel planes, of auxiliary thread-holding means comprising a thread-engaging device and means for supporting said device in two positions at different vertical heights to correspond with the positions of the respective warp clamps.

32. The combination with means for supporting a sheet of warp threads of an auxiliary thread-holding means comprising a pivoted structure having a thread-engaging device thereon; spring means tending to swing said structure away from said supporting means; a spring-locking device for holding said structure in its operative position, said device being operable to permit said structure to swing downwardly away from said supporting means and into an inoperative position.

33. A means for supporting a section of a warp having heddles and a reed thereon comprising a framework, means thereon for supporting the heddles, horizontally slidable means on said framework for supporting one end of the warp, and means on said horizontally slidable means for supporting the reed.

34. In a warp-supporting frame, in combination, means for supporting a loom beam; a pair of horizontal guide rails located above said supporting means; slides mounted on said guide rails; a pin bar having its ends mounted in said slides; means on said pin bar for supporting the reed; and a releasable locking means for positioning said slides with respect to said guide bar.

35. In a warp-supporting frame, in combination, a pair of horizontally extending guide rails; a slide mounted on each of said rails; a warp-supporting bar having its ends mounted in said slides; a dog pivoted on each of said slides, said guide rails having teeth with which said dogs are adapted to interlock; a spring pawl for holding each of said dogs in its inoperative position; and a hand lever engaging each of said dogs for swinging the latter into and out of engagement with said rack teeth.

36. In a warp-supporting frame, in combination, a pair of horizontal guide rails; slides mounted thereon; a warp-supporting bar having its ends mounted in said slides, said bar having a channel member thereon to receive one edge of a reed and having movable hooks thereon to engage the other edge of the reed.

HOWARD D. COLMAN.

Witnesses:
 WM. D. HINTZE,
 LOUISE A. CULVER.